US012609525B2

(12) United States Patent
Yun et al.

(10) Patent No.: US 12,609,525 B2
(45) Date of Patent: Apr. 21, 2026

(54) SOLID STATE CIRCUIT BREAKER AND CONTROL METHOD THEREFOR

(71) Applicant: LS ELECTRIC CO., LTD., Anyang-si (KR)

(72) Inventors: Dongjin Yun, Anyang-si (KR); Sunghee Kang, Anyang-si (KR); Woonghyeob Song, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 140 days.

(21) Appl. No.: 18/691,963

(22) PCT Filed: Oct. 12, 2022

(86) PCT No.: PCT/KR2022/015407
§ 371 (c)(1),
(2) Date: Mar. 14, 2024

(87) PCT Pub. No.: WO2023/120909
PCT Pub. Date: Jun. 29, 2023

(65) Prior Publication Data
US 2024/0388080 A1 Nov. 21, 2024

(30) Foreign Application Priority Data

Dec. 23, 2021 (KR) ........................ 10-2021-0186357

(51) Int. Cl.
*H02H 9/00* (2006.01)
*H02H 3/02* (2006.01)
*H02H 3/093* (2006.01)

(52) U.S. Cl.
CPC ............ *H02H 9/001* (2013.01); *H02H 3/021* (2013.01); *H02H 3/025* (2013.01); *H02H 3/093* (2013.01)

(58) Field of Classification Search
CPC ........ H02H 3/087; H02H 9/001; H02H 9/002; H02H 9/005; H02H 3/025
See application file for complete search history.

(56) References Cited

U.S. PATENT DOCUMENTS 5,550,702 A * 8/1996 Schmidt ................. H02H 9/025
361/103
10,541,530 B2 1/2020 Kennedy et al.
(Continued)

FOREIGN PATENT DOCUMENTS

JP 2013172603 A 9/2013
KR 101057958 B1 8/2011
(Continued)

OTHER PUBLICATIONS

International Search Report for related International Application No. PCT/KR2022/015407; action dated Jun. 29, 2023; (2 pages).
(Continued)

*Primary Examiner* — Thienvu V Tran
*Assistant Examiner* — Christopher J Clark
(74) *Attorney, Agent, or Firm* — K&L Gates LLP

(57) ABSTRACT

The present disclosure relates to a solid state circuit breaker, comprising: a semiconductor switch unit including a semiconductor switch that electrically connects or disconnects a power system and a load according to a voltage applied to a gate terminal; and a control unit that, when the semiconductor circuit breaker is turned on, controls the semiconductor switch to repeat turn-on and turn-off operations for a predetermined initial driving time so as to gradually alleviate the magnitude of inrush current caused by an initial connection between the power system and the load.

20 Claims, 10 Drawing Sheets

(56) References Cited

U.S. PATENT DOCUMENTS

2020/0083699 A1* 3/2020 Kennedy ............... H02H 7/0833
2021/0044145 A1* 2/2021 Hazani ............... H02J 13/00002
2023/0253783 A1* 8/2023 Mondal ............... H01M 50/204
                                                        320/134

FOREIGN PATENT DOCUMENTS

KR           101600015 B1    3/2016
KR         20170108140 A     9/2017

OTHER PUBLICATIONS

Written Opinion for related International Application No. PCT/KR2022/015407; action dated Jun. 29, 2023; (4 pages).

* cited by examiner

SOLID STATE CIRCUIT BREAKER AND CONTROL METHOD THEREFOR

CROSS-REFERENCE TO RELATED APPLICATIONS

This application is the National Stage filing under 35 U.S.C. 371 of International Application No. PCT/KR2022/015407, filed on Oct. 12, 2022, which claims the benefit of earlier filing date of and rights of priority to Korean Application 10-2021-0186357, filed on Dec. 23, 2021, the contents of which are all hereby incorporated by reference herein in their entirety.

TECHNICAL FIELD

The present disclosure relates to a circuit breaker, and more particularly to, a solid state circuit breaker (SSCB) using a power semiconductor switch.

BACKGROUND ART

When a failure occurs in a power system that supplies power, an abnormal current such as an overcurrent or fault current may flow into a load through the power system. In addition, the abnormal current flowing thereinto may cause a burnout of the load. Therefore, in order to prevent the abnormal current from flowing into the load when a failure of the power system occurs, a circuit breaker may be used to disconnect the load from the power system in order to cut off the flow of a current into the load.

In the case of a mechanical circuit breaker in the related art, it takes a relatively long time period of several tens of milliseconds until a circuit is cut off, and during that time period, there is a problem that an abnormal current flows into the load. Therefore, in recent years, a solid state circuit breaker (SSCB) capable of high-speed current interruption including a semiconductor switch configured with a power semiconductor capable of conducting a large current and having a high-speed switching frequency is used.

In the case of the solid state circuit breaker, a time period required to detect a current is very short compared to a breaker such as a molded case circuit breaker (MCCB), and thus there is an advantage capable of interrupting a circuit at a high speed. However, since the time period required to detect the current is very short as described above, there is a problem in that even when a transient current, that is, an inrush current, that increases momentarily but returns to a normal state within a short period of time occurs, it is detected to break the circuit.

Therefore, a typical solid state circuit breaker includes a separate initial charging circuit to prevent a circuit from being interrupted by an inrush current that occurs when the solid state circuit breaker is turned on in a no-load state to form a circuit between a power system and a load, that is, during an initial start-up of the load.

The initial charging circuit may include an initial charging resistor and a switch that connects the circuit to either an electric circuit that passes through the initial charging resistor or a bypass circuit that bypasses the initial charging resistor. Therefore, a typical solid state circuit breaker has a problem in that the configuration of the circuit becomes complicated due to the initial charging circuit and its size increases due to an internal space for providing the initial charging circuit.

SUMMARY

The present disclosure aims to solve the foregoing problems and other problems, and an aspect of the present disclosure is to provide a solid state circuit breaker that does not generate a circuit interruption due to an inrush current that occurs at an initial start-up of a load even without having an initial charging circuit, and a method of controlling the solid state circuit breaker.

In order to achieve the foregoing and other objectives, there is provided a solid state circuit breaker disposed between a power system and a load, the solid state circuit breaker including a semiconductor switch unit including a semiconductor switch that electrically connects or disconnects between the power system and the load depending on a voltage applied to a gate terminal thereof, and a control unit that controls, when the solid state circuit breaker is turned on, the semiconductor switch to repeat turn-on and turn-off during a preset initial operation time period so as to gradually mitigate a magnitude of inrush current due to an initial connection between the power system and the load.

In one embodiment, the control unit may execute, during the initial operation time period, only a hardware trip function only when a current level in the solid state circuit breaker reaches a first current level at which a trip function built into the semiconductor switch is executed.

In one embodiment, the control unit may control the semiconductor switch such that the turn-on and turn-off are repeated in a preset time period as a cycle during the initial operation time period.

In one embodiment, the solid state circuit breaker may further include an input unit that receives a user's input, wherein the control unit receives initial operation information including information on a semiconductor switch duty cycle, which is a ratio between the preset time period and a time period in which the semiconductor switch is turned on, a number of on/off repetitions in which the semiconductor switch is repeatedly turned on and off during the initial operation time period, and the initial operation time period, through the input unit.

In one embodiment, the control unit may generate, when the initial operation information is received, a duty signal to control the at least one semiconductor switch during the initial operation time period according to the initial operation information, wherein the duty signal is a gate voltage signal to be applied to the gate terminal of the at least one semiconductor switch according to the semiconductor switch duty cycle in the preset time period as a cycle.

In one embodiment, in the semiconductor switch duty cycle, a turn-on time period of the semiconductor switch may be set differently for each cycle, and as the turn-on and turn-off of the semiconductor switch continue, the turn-on time period of the semiconductor switch may be formed to be longer within one cycle.

In one embodiment, the solid state circuit breaker may further include a plurality of gate drivers that apply a gate voltage to each gate terminal of the semiconductor switch, wherein the control unit controls at least one gate driver corresponding to each of the semiconductor switches to apply a gate voltage above a threshold voltage or to apply a gate voltage below the threshold voltage to the gate terminal of the semiconductor switch to turn on and off the semiconductor switch.

In one embodiment, the solid state circuit breaker may further include a cut-off switch that physically connects or disconnects the solid state circuit breaker and the load from the power system, wherein the control unit counts, during the initial operation time period, a number of times in which a condition for executing a soft trip function is satisfied when the current level in the solid state circuit breaker reaches a second current level at which the soft trip function is executed, when the number of times in which the condition for executing the soft trip function is satisfied is above a preset number of times, or when a current inside the solid state circuit breaker is above a preset current level at which the cut-off switch operates, the cut-off switch is operated to physically separate between the power system and the load, and the second current level is a current level lower than the first current level.

In one embodiment, the solid state circuit breaker may further include a memory including a semiconductor switch duty cycle, which is a ratio of the preset time period and a time period in which the semiconductor switch is turned on, and a number of on/off repetitions in which the semiconductor switch is repeatedly turned on and off during the initial operation time period, wherein the control unit increases or decreases at least one of the semiconductor switch duty cycle and the number of on/off repetitions depending on whether a condition for executing a soft trip function is satisfied while the semiconductor switch is repeatedly turned on and off.

In one embodiment, the solid state circuit breaker may further include a memory including a semiconductor switch duty cycle, which is a ratio of the preset time period and a time period in which the semiconductor switch is turned on, and a number of on/off repetitions in which the semiconductor switch is repeatedly turned on and off during the initial operation time period, wherein the control unit calculates the characteristics of an inrush current according to an initial connection between the power system and the load, and increases or decreases at least one of the semiconductor switch duty cycle and the number of on/off repetitions according to the calculated characteristics of the inrush current.

In one embodiment, the inrush current characteristics may include either a time-dependent amount of change in a magnitude of current detected by the solid state circuit breaker during an initial connection between the power system and the load or a statistical calculation value in a current measurement value.

In one embodiment, the power system and the load may be a direct current power system and a direct current power load.

In addition, according to the present disclosure, there is provided a method of controlling a solid state circuit breaker disposed between a power system and a load, the solid state circuit breaker including a semiconductor switch, the method including turning on, when the solid state circuit breaker is turned on, the semiconductor switch to initially connect between the power system and the load, and repeating the turn-off and turn-on of the semiconductor switch so as to gradually mitigate a magnitude of inrush current due to an initial connection between the power system and the load during a preset initial operation time period.

In one embodiment, the preset initial operation time period may be a time period in which only a hardware trip function is executed only when a current level in the solid state circuit breaker reaches a first current level at which a trip function built into the semiconductor switch is executed.

In one embodiment, the repeating of the turn-off and turn-on of the semiconductor switch may be the repeating of the turn-off and turn-on in a preset time period as a cycle during the initial operation time period, and the limiting of the execution of a soft trip function when a current level in the solid state circuit breaker reaches a second current level at which the soft trip function is executed during the initial operation time period.

In one embodiment, the turn-off and turn-on of the semiconductor switch may be performed by a gate voltage signal to be applied to a gate terminal of the semiconductor switch according to a semiconductor switch duty cycle, which is a ratio of a time period in which the semiconductor switch is turned on during one cycle in which the semiconductor switch is turned off and on once, and a number of on/off repetitions in which the semiconductor switch is repeatedly turned on and off, wherein the initially connecting between the system and the load further includes generating the gate voltage signal based on the preset semiconductor duty cycle and period, and the initial operation time period.

In one embodiment, the repeating of the turn-off and turn-on of the semiconductor switch may further include checking whether a current level in the solid state circuit breaker has satisfied an execution condition of a soft trip function, decreasing the semiconductor switch duty cycle when the execution condition of the soft trip function is satisfied, and increasing the semiconductor switch duty cycle when the execution condition of the soft trip function is not satisfied.

In one embodiment, the repeating of the turn-off and turn-on of the semiconductor switch may further include checking whether a current level in the solid state circuit breaker has satisfied an execution condition of a soft trip function, increasing the number of on/off repetitions of the semiconductor switch when the execution condition of the soft trip function is satisfied, and decreasing the number of on/off repetitions of the semiconductor switch when the execution condition of the soft trip function is not satisfied.

In one embodiment, the checking of whether the current level in the solid state circuit breaker satisfies the execution condition of the soft trip function may further include checking a number of times in which the execution condition of the soft trip function is satisfied while the turn-off and turn-on of the semiconductor switch are repeated, and operating a cut-off switch to physically separate between the power system and the load when the execution condition of the soft trip function is satisfied a preset number of times or more.

In one embodiment, the initially connecting between the system and the load may further include calculating the characteristics of an inrush current according to an initial connection between the power system and the load, and increasing or decreasing at least one of the semiconductor switch duty cycle and the number of on/off repetitions according to the calculated characteristics of the inrush current.

In one embodiment, in the semiconductor switch duty cycle, a turn-on time period of the semiconductor switch may be set differently for each cycle, and as the turn-on and turn-off of the semiconductor switch continue, the turn-on time period of the semiconductor switch may be formed to be longer within one cycle.

The effects of a solid state circuit breaker and a solid state circuit breaker control method according to the present disclosure will be described as follows.

According to at least one of embodiments of the present disclosure, a solid state circuit breaker according to the present disclosure turns off, when a circuit is formed between a power system and a load in a no-load state to cause an inrush current, a semiconductor switch before disconnecting the load from the system in a hardware manner, to lower a current flowing into the load, and turns on the semiconductor switch back to allow the current to flow into the load when the current in the semiconductor circuit breaker is sufficiently low.

Therefore, the solid state circuit breaker according to the present disclosure does not require an initial charging circuit to eliminate an inrush current due to an initial start-up, thereby having an effect of simplifying an internal structure of the solid state circuit breaker as well as further reducing its size.

In addition, according to the present disclosure, at least one of a ratio of turn-on and turn-off of the semiconductor switch (hereinafter referred to as a semiconductor switch duty cycle) and a number of on/off repetitions of the semiconductor switch for mitigating the inrush current may be automatically set according to a user or an operating state of the semiconductor switch.

Therefore, the duty cycle and/or the number of on/off repetitions of the semiconductor switch may be set regardless of a pulse width or pulse period of an alternating current, and thus may be applied to a direct current (DC) power system and a direct current load, thereby having an effect of shortening a time period required to mitigate the inrush current.

DETAILED DESCRIPTION

It is noted that the technical terms used herein are used only to describe specific implementations and are not intended to limit the invention. A singular representation used herein may include a plural representation unless it represents a definitely different meaning from the context. In general, suffixes such as "module" and "unit" may be used to refer to elements or components. Use of such suffixes herein is merely intended to facilitate description of the specification, and the suffix itself is not intended to give any special meaning or function.

In this application, the terms "comprising" and "including" should not be construed to necessarily include all of the elements or steps disclosed herein, and should be construed not to include some of the elements or steps thereof, or should be construed to further include additional elements or steps.

In describing the technology disclosed in this specification, if a detailed explanation for a related known function or construction is considered to unnecessarily divert the gist of the present disclosure, such explanation has been omitted but would be understood by those skilled in the art.

Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure. In addition, it will be understood that the implementations described below, as well as combinations of implementations, are changes, equivalents, or substitutes included in the scope of the present disclosure and correspond to the scope of the present disclosure.

Figure 1:
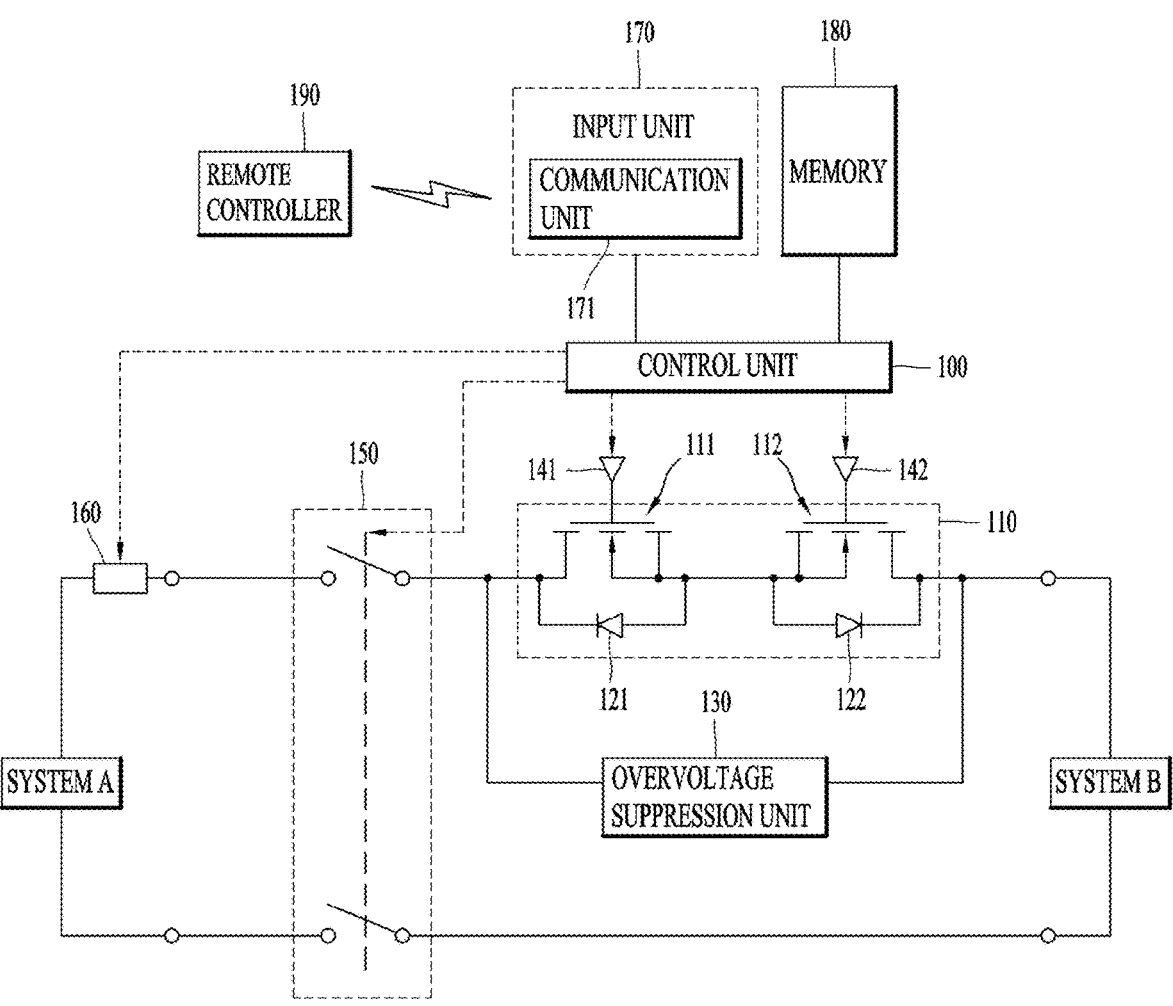
FIG. 1 is a block diagram showing a structure of a solid state circuit breaker according to an embodiment of the present disclosure.

First, FIG. 1 is a circuit diagram showing a structure of a solid state circuit breaker according to an embodiment of the present disclosure.

Referring to FIG. 1, a solid state circuit breaker according to an embodiment of the present disclosure may be configured to include a semiconductor switch unit 110 including a first semiconductor switch 111 and a second semiconductor switch 112 connected in series with each other to be turned on/off between system A and system B, a cut-off switch 150, a current sensor 160, first and second gate drivers 141, 142, an overvoltage suppression unit 130, and a control unit 100. Furthermore, the solid state circuit breaker may be configured to include an input unit 170 and a memory 180 connected to the control unit 100.

Here, the system A may be a power system and the system B may be a load. In this case, a current flow may be formed from the system A to the system B. Alternatively, in a case where the system A is a load and the system B is a power system, a current flow may be formed from the system B to the system A. In this case, the current flow from the system A to the system B or from the system B to the system A may be cut off by the solid state circuit breaker according to an embodiment of the present disclosure.

In addition, both the system A and the system B may be power systems. For an example, the system A and the system B may be different micro grids. In this case, a bidirectional current flow may be formed from the system A to the system B as well as from the system B to the system A. Furthermore, the current flow from the system A to the system B, the current flow from the system B to the system A, and the bidirectional current flow between the system A and the system B may be cut off by the solid state circuit breaker according to an embodiment of the present disclosure.

For such a bidirectional cut-off, the first semiconductor switch 111 and the second semiconductor switch 112 may be configured to cut off a circuit not only when a current flows from system A to system B, but also when a current flows from the system B to the system A. For an example, the first semiconductor switch 111 and the second semiconductor switch 112 may be semiconductor switches configured with N-channel MOSFET devices in which a source and a drain are disposed in opposite directions.

The first semiconductor switch 111 and the second semiconductor switch 112 may further include first and second diodes 121, 122 disposed in opposite directions to the flow of a current to prevent damage to the MOSFET devices due to a reverse voltage when a circuit is cut off due to a fault current. In this case, an anode and a cathode of each of the first and second diodes 121, 122 may be connected to a source terminal and a drain terminal of each of the MOSFET devices 111, 112.

Therefore, the first diode 121 may be connected in parallel to the MOSFET device of the first semiconductor switch 111 and disposed in an opposite direction to a current flowing from the system A to the system B. In addition, the second diode 122 may be connected in parallel to the MOSFET device of the second semiconductor switch 112 and disposed in an opposite direction to a current flowing from the system B to the system A.

As described above, a solid state circuit breaker according to an embodiment of the present disclosure may include the first semiconductor switch 111 and the second semiconductor switch 112 configured in a complementary symmetrical manner to cut off any fault current flowing in both directions.

Meanwhile, in the following description, for convenience of explanation, it will be described on the assumption that system A is a power system and system B is a load. However, as described above, the solid state circuit breaker according to an embodiment of the present disclosure is configured to cut off any fault current flowing in both directions, and the present disclosure is, of course, not limited thereto.

Additionally, the cut-off switch 150 may cut off connection from any one system to a solid state circuit breaker and a load, or another system. The cut-off switch 150 may be a mechanical switch, and may physically insulate and separate the solid state circuit breaker from the power system in which an accident has occurred.

As shown in FIG. 1, the cut-off switch 150 may be disposed between the system A and the semiconductor switch unit 110. Meanwhile, the location of the cut-off switch 150 may not be limited thereto, and may of course be disposed at any other location (e.g., between the system B and the semiconductor switch unit 110).

Meanwhile, the overvoltage suppression unit 130 may prevent an overvoltage from being formed across the semiconductor switch unit 110 due to a residual current when the solid state circuit breaker cuts off the circuit. The overvoltage suppression unit 130 may include a snubber circuit or a device for suppressing an overvoltage, for example, a transient voltage suppressor (TVS) device. Alternatively, the overvoltage suppression unit 130 may include free-wheeling circuits configured with at least one diode and a resistor and connected to both ends of the semiconductor switch unit 110, respectively.

Meanwhile, the first and second gate drivers 141, 142 may apply gate voltages to the first and second semiconductor switches 111, 112, respectively, constituting the semiconductor switch unit 110 under the control of the control unit 100.

In this case, when a gate voltage exceeding a threshold voltage of each of the first and second semiconductor switches 111, 112 is applied, a resistance value of an output terminal of each of the first and second semiconductor switches 111, 112 may decrease, and accordingly, the input and output terminals of the first and second semiconductor switches 111, 112 may be conducted to form a circuit between the system A and the system B.

Hereinafter, the case where a voltage above a threshold voltage is applied to a gate terminal of each semiconductor switch so that the input and output terminals of the first and second semiconductor switches 111, 112 are conducted will be described as turning on the semiconductor switch.

On the other hand, when a gate voltage lower than the threshold voltage of each of the first and second semiconductor switches 111, 112 is applied or when the gate voltage is not applied, the resistance value of the output terminal of each of the first and second semiconductor switches 111, 112 may be equal to or greater than that of the input terminal thereof. Accordingly, the input and output terminals of the first and second semiconductor switches 111, 112 may not be conducted. Therefore, the system A and the system B may be electrically separated (insulated) to disconnect a circuit connection.

Hereinafter, the case where a voltage lower than the threshold voltage is applied to a gate terminal of each semiconductor switch or a voltage is not applied to the gate terminal so that the input and output terminals of the first and second semiconductor switches 111, 112 are not conducted will be described as turning off the semiconductor switch.

Meanwhile, the semiconductor switch may be provided with a desaturation (DESAT) function. The DESAT function is to prevent an overcurrent from flowing in through a semiconductor switch when the semiconductor switch is in an unsaturated state, which may denote a function of detecting an overcurrent and a short circuit through measuring a voltage between the drain terminal and the source terminal when the semiconductor switch is turned on, and turning off the semiconductor switch to protect, when an overcurrent is detected, other systems and the solid state circuit breaker from the overcurrent. Hereinafter, disconnecting between the system A and the system B as the semiconductor switch is turned off by the DESAT function as described above will be referred to as a hardware-wise trip, that is, a hardware trip. That is, the hardware trip may be a trip function that is performed by itself according to a function built into the semiconductor switch, without the control of the control unit 100.

Meanwhile, in the solid state circuit breaker, the control unit 100 may control the first and second semiconductor switches 111, 112 to perform a trip function when an overcurrent is detected. In this case, the control unit 100 may control the first and second gate drivers 141, 142 to perform the trip function so as not to apply a voltage above the threshold voltage to the first and second semiconductor switches 111, 112. A trip performed by the control unit 100 in this manner will be referred to as a soft trip to distinguish it from the hard trip.

Meanwhile, in the case of the soft trip, even when a connection between the system and the load is disconnected due to the trip, the input and output terminals of the first and second semiconductor switches 111, 112 may be electrically conducted again only through controlling the first and second gate drivers 141, 142 by means of the control unit 100. Therefore, a time period to reconnect the system and the load and resume current supply to the load may be shorter than a hardware trip.

On the other hand, the hard trip, which is a trip function built into a semiconductor switch, may be a trip function performed regardless of the control of the control unit 100. Therefore, in order to prevent the hard trip from being executed indiscriminately and frequently, a current level (first current level) at which a hard trip function is executed may be formed to be higher than a current level (second current level) at which a trip function under the control of the control unit 100 is executed.

Meanwhile, as described above, an inrush current, which refers to a very large current that flows into a load when a current begins to be supplied to the load through a circuit connection in a no-load state, may refer to a current that is several times larger than the rated current. The inrush current, which is generated by a capacitance component of a load, may be generated in a process of charging a capacitor of the load, which has been in a fully discharged state due to a no-load state, with a current supplied from a system as a circuit is formed.

Therefore, a magnitude of the generated inrush current may vary depending on a capacitor capacitance of the load connected to the system and a capacitor charging state of the load. Therefore, when the capacitor of the load is charged due to a current (e.g. inrush current) supplied from the system, the inrush current gradually decreases, and when the capacitor of the load is fully charged, only the rated current may be supplied to the load as the inrush current disappears.

Meanwhile, when the system and the load are connected while the capacitor of the load is not fully charged, an inrush current may occur again. In this case, a current level inside the solid state circuit breaker may increase due to the generation of the inrush current.

On the other hand, in a state where the system and the load are disconnected, that is, in a tripped state, a current from the system may not be supplied to the load. Therefore, a current supplied from the system to the load may be interrupted, and accordingly, an inrush current may not be generated. Therefore, the current level inside the solid state circuit breaker may be reduced.

However, when a connection between the system and the load is interrupted after the system and the load are connected to allow the load to receive a current from the system, the capacitor of the load may be partially charged by the current supplied prior to the interruption. Therefore, when the interrupted circuit is reconnected, an amount of the inrush current may be reduced.

Accordingly, the control unit 100 of the solid state circuit breaker according to an embodiment of the present disclosure may interrupt a circuit connection between the load and the system before a current inside the semiconductor circuit breaker exceeds a current level (second current level) at which the hardware trip is generated due to the generation of an inrush current when the load and the system are connected in a no-load state to begin supplying a current to the load, Therefore, a hardware trip may be prevented from being generated due to an inrush current.

Furthermore, when the current level flowing inside the solid state circuit breaker decreases below a predetermined level due to the circuit disconnection, the circuit between the load and the system is connected again to resume the supply of the current to the load. Furthermore, by repeating a process of interrupting a circuit connection between the load and the system prior to exceeding the first current level, the capacitor of the load may be gradually charged, and thus the magnitude of the inrush current when the circuit connection is resumed may be gradually reduced.

On the other hand, controlling the semiconductor switch to interrupt a connection between the load and the circuit in order to mitigate an inrush current as described above may be performed even when a current flowing in the solid state circuit breaker does not reach a current level (second current level) at which a soft trip of the semiconductor switch is generated.

That is, in the present disclosure, turning off the semiconductor switch to mitigate the inrush current to interrupt a connection between the load and the circuit is carried out regardless of a trip for separating the system and the load when an accident occurs. Therefore, even when a current inside the solid state circuit breaker does not reach the current level at which the trip (soft trip) occurs, the semiconductor switch of the solid state circuit breaker according to an embodiment of the present disclosure may be turned off, and when a preset time period elapses, even when the current inside the semiconductor circuit breaker is above the current level at which the trip (soft trip) occurs, the semiconductor switch may be turned on again to connect between the system and the load.

Therefore, the control unit 100 of the solid state circuit breaker according to an embodiment of the present disclosure may not execute the soft trip even when the current inside the semiconductor circuit breaker reaches the second current level at which the soft trip is generated so as to allow the semiconductor switch to repeat turn-on and turn-off for a preset time period regardless of the current level while the load is initially connected to the system to perform an initial operation for mitigating the inrush current. In this case, the control unit 100 may only check whether the current inside the solid state circuit breaker reaches the second current level at which the soft trip is generated while performing the initial operation, and may count a number of times it has been checked.

Therefore, the control unit 100 of the solid state circuit breaker according to an embodiment of the present disclosure may repeatedly turn on and off the semiconductor switch regardless of whether a trip function of the semiconductor switch is executed during a preset initial operation time period when the load is initially connected to the system. Furthermore, after the initial operation time period has elapsed, the soft trip function may be normalized. Therefore, the soft trip may be performed when a current above the second current level is detected inside the solid state circuit breaker after the initial operation time period has elapsed.

Here, the trip function restricted to a time period during which the initial operation is performed, that is, the initial operation time period, may be limited to a soft trip. Therefore, the hard trip function of the semiconductor switch may be performed at a hardware level as it is, and accordingly, when a current above the first current level at which the hard trip occurs is detected, the turn-off of the semiconductor switches according to the hard trip may be carried out even when the initial operation time period has not elapsed. Therefore, even during the initial operation time period, other systems, loads, or elements inside the solid state circuit breaker may be protected from an overcurrent above a preset level.

Meanwhile, as described above, the turn-on and turn-off of the semiconductor switches 111, 112 may be controlled through a gate voltage applied to each of the semiconductor switches 111, 112. That is, when the control unit 100 controls a gate driver to apply a gate voltage less than a threshold voltage to the gate terminal or to not apply the gate voltage thereto, each semiconductor switch may be turned off to interrupt a connection between the load and the system. Conversely, when the control unit 100 controls the gate driver to apply a gate voltage above the threshold voltage to the gate terminal, each semiconductor switch may be turned on to connect between the load and the system.

Figure 2:
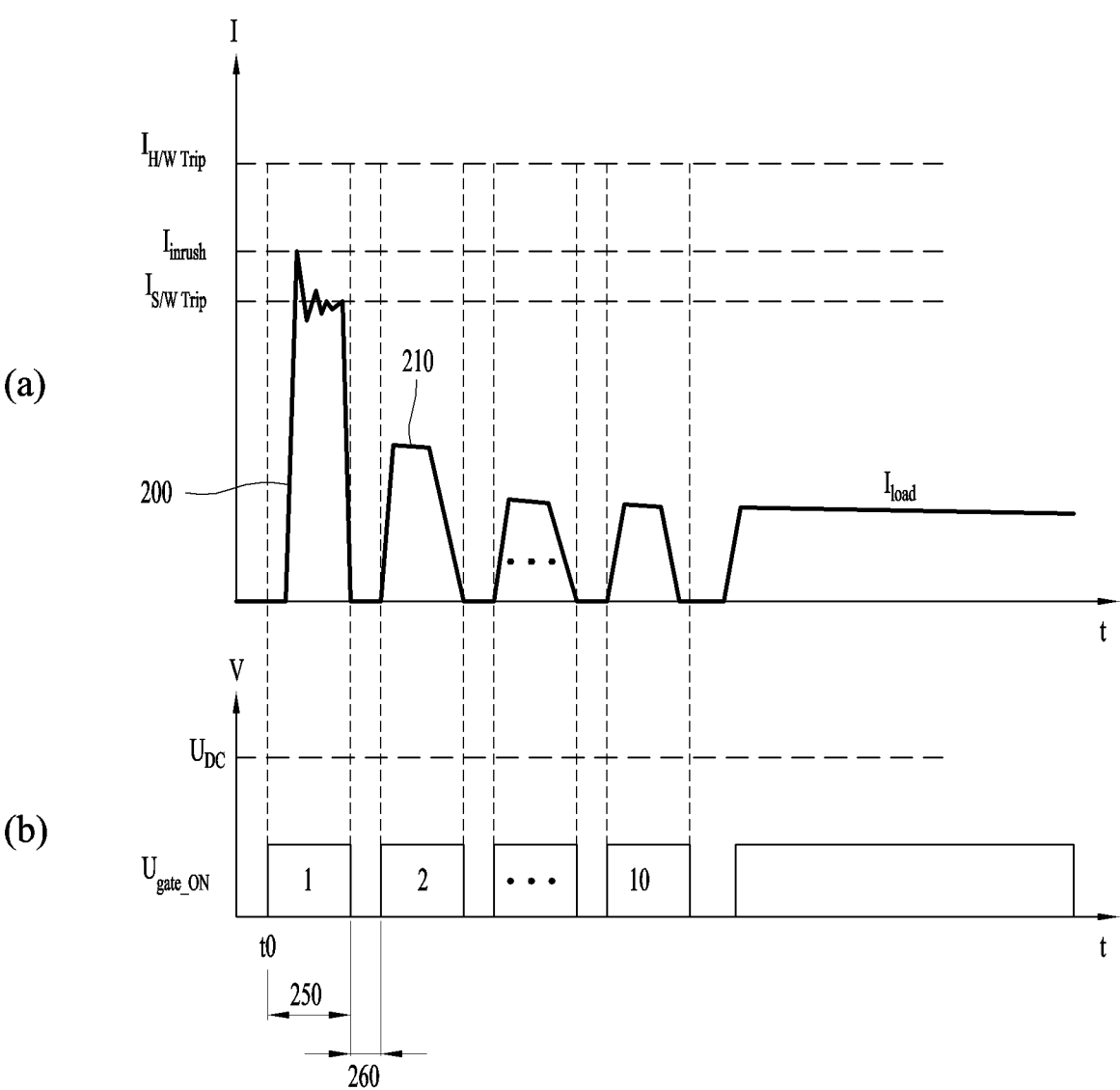
FIG. 2 is an exemplary diagram showing an example in which a solid state circuit breaker according to an embodiment of the present disclosure mitigates, during an initial start-up of a load, an inrush current flowing into the load by controlling a semiconductor switch.

FIG. 2 below is an exemplary diagram showing an example in which the control unit 100 of the solid state circuit breaker according to an embodiment of the present disclosure controls a voltage applied to the gate terminal at an initial start-up of a load in this manner to mitigate an inrush current flowing into the load.

Referring to FIG. 2, (a) of FIG. 2 shows an amount of current detected in the solid state circuit breaker when the system and the load are connected to each other. Furthermore, (b) of FIG. 2 assumes that the turn-on and turn-off of each of the semiconductor switches 111, 112 are repeated 10 times under the control of the control unit 100.

When the load and the circuit are initially connected, while a voltage above the threshold voltage is applied to the gate terminal (gate on ($U_{gate\_ON}$), i.e., turn-on of the semiconductor switch in (b) of FIG. 2) (250), a current of the system may be supplied to the load. Here, in case where the capacitor of the load is fully discharged, as shown in (a) of FIG. 2, an amount of current (200) flowing in from the system to charge the capacitor of the load may be greatly increased. That is, an inrush current may occur.

Then, the control unit 100 may control the gate driver to apply a voltage below the threshold voltage to the gate terminal (i.e., to turn off the semiconductor switch) before an amount of the incoming current (200) exceeds the hardware trip level ($I_{H/W\ Trip}$) (first current level). Therefore, a connection between the system and the load may be interrupted, and accordingly, as shown in (a) of FIG. 2, the supply of a current from the system may be cut off during a circuit connection interruption time period (260) to reduce the current in the solid state circuit breaker.

Meanwhile, when the amount of current changes as shown in (a) of FIG. 2, the control unit 100 may detect whether the increased amount of current (200) during the first semiconductor switch turn-on time (250) is above a preset soft trip level (Is/w Trip) (second current level).

In this case, in the solid state circuit breaker according to an embodiment of the present disclosure, the execution of the soft trip is limited even when a current of the soft trip level is detected while the initial operation is carried out. Therefore, regardless of the detected amount of current, when a turn-on time period of the semiconductor switch has passed a predetermined time period (250), the control unit 100 may control the gate driver to apply a voltage below the threshold voltage to the gate terminal. Therefore, regardless of the amount of current inside the solid state circuit breaker, the semiconductor switch may be turned off when the predetermined time period (250) has elapsed.

Meanwhile, when the turn-on time period of the semiconductor switch has passed a predetermine time period (260), the control unit 100 may control the gate driver to apply a voltage above the threshold voltage to the gate terminal regardless of whether the current level is restored. Therefore, the semiconductor switch may be turned on again, and the system and the load may be connected again accordingly. Furthermore, the current of the system may be supplied again to the load.

In this case, when the capacitor of the load is not fully charged, a current (210) above the rated current may be supplied from the system again, as shown in (a) of FIG. 2. However, the capacitor of the load has been charged by a current supplied during the time period (250) while the system and the load have been previously connected to each other, a level of the current (210) flowing again from the system may be lower than that of the current (200) that has been initially introduced.

The control unit 100 of the solid state circuit breaker according to an embodiment of the present disclosure may control the gate driver to repeatedly turn on and turn off the semiconductor switches in this manner, thereby gradually mitigating the magnitude of the inrush current. Therefore, as shown in (a) and (b) of FIG. 2, when the turn-on and turn-off of the semiconductor switches are repeated a preset number of times (10 times), the inrush current may gradually lower and eventually disappear to supply only a current corresponding to the rated current ($I_{load}$) level from the system to the load. In this case, the control unit 100 may continuously maintain a turn-on state of the semiconductor switches to maintain a state in which a current is supplied from the system to the load.

Meanwhile, as described above, the turn-on and turn-off of the semiconductor switch may be carried out by adjusting a gate voltage applied thereto through the gate driver, and thus may be performed at a very high speed. Therefore, even when repetition is performed a preset number of times (10 times in FIG. 2), it may be completed within a very short time period (several msec). In other words, the inrush current due to the initial start-up of the load may be mitigated within a very short time period.

Meanwhile, a number of turn-on and turn-off repetitions of the foregoing semiconductor switches and a ratio of a time period in which the semiconductor switch is turned on during one cycle in which the semiconductor switch is turned on and off, that is, a duty cycle of the semiconductor switch, may be set depending on various methods. For an example, a duty cycle of the semiconductor switch and a number of on/off repetitions of the semiconductor switch may be set by a user.

To this end, the solid state circuit breaker according to an embodiment of the present disclosure may be provided with an input unit 170 that can receive the user's input. In this case, the input unit 170 may include at least one of at least one button or switch and a touch input element. For an example, the touch input element may be a virtual key, soft key, or visual key displayed on a touch screen.

Meanwhile, the input unit 170 may further include a communication unit 171 capable of performing a communication connection with a preset external terminal. In this case, the communication unit 171 may perform wireless communication with the external terminal through short-range communication technologies such as Bluetooth™, Infrared Data Association (IrDA), and Wireless-Fidelity (UWi-Fi), or wireless communication technologies such as Wireless LAN (WLAN), Wi-Fi, Long Term Evolution (LTE), and LTE-Advanced (LTE-A).

Here, the external terminal, which is a remote controller 190 capable of remotely inputting data to the input unit 170, may include the user's mobile phone, smart phone, laptop computer, personal digital assistants (PDA), slate PC, tablet PC, ultrabook, and the like.

Meanwhile, the duty cycle of the semiconductor switch and the number of on/off repetitions of the semiconductor switch, which are set according to a user input received through the input unit 170 or the remote controller 190, may be stored in the memory 180. Meanwhile, the duty cycle of the semiconductor switch and the number of on/off repetitions of the semiconductor switch set to mitigate the inrush current may be dynamically set depending on an operating state of the solid state circuit breaker or a current flowing into the solid state circuit breaker.

For an example, as a result of detecting the operating state of the solid state circuit breaker, the control unit 100 may dynamically change at least one of the duty cycle of the semiconductor switch and the number of on/off repetitions of the semiconductor switch depending on whether a condition for performing a soft trip is satisfied. Here, the condition for performing a soft trip may refer to a case where a current inside the solid state circuit breaker reaches the second current level.

Alternatively, the control unit 100 may detect the current characteristics of the solid state circuit breaker and set at least one of the duty cycle of the semiconductor switch and the number of on/off repetitions of the semiconductor switch based on the detected current characteristics.

Hereinafter, an operation process of the solid state circuit breaker according to an embodiment of the present disclosure, which sets the duty cycle of the semiconductor switch and the number of on/off repetitions of the semiconductor switch based on the operating state of the solid state circuit breaker will be described with reference to FIGS. 6 and 7.

Furthermore, an operation process of the solid state circuit breaker according to an embodiment of the present disclosure, which sets the duty cycle of the semiconductor switch and the number of on/off repetitions of the semiconductor switch based on the characteristics of a current flowing into the solid state circuit breaker will be described with reference to FIG. 9 below.

Meanwhile, as described above, the duty cycle of the semiconductor switch and the number of on/off repetitions of the semiconductor switch may be set in various ways based on the user's input, the operating state of the solid state circuit breaker, or the detected current characteristics.

Figure 3:
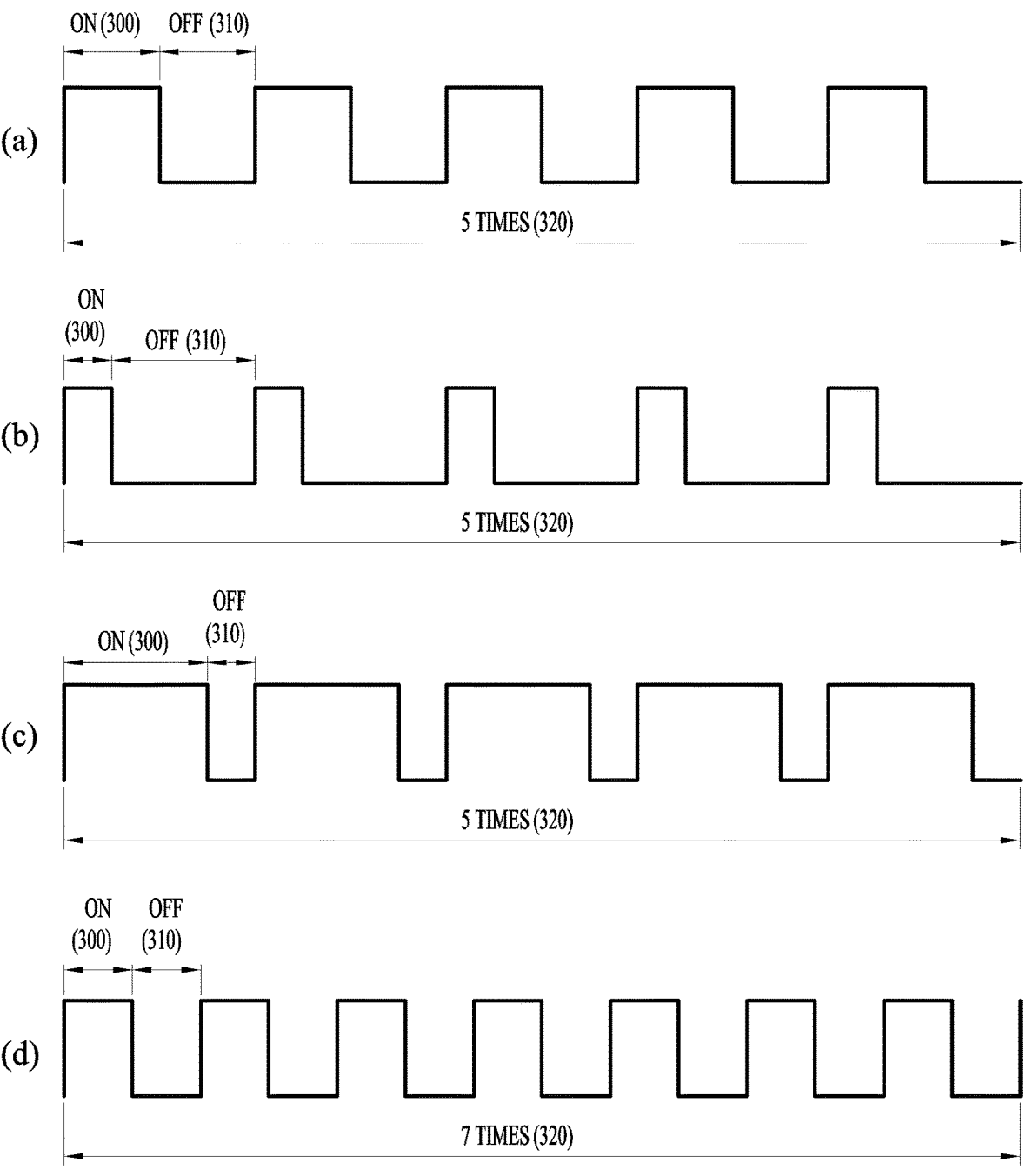
FIGS. 3 and 4 show examples of semiconductor switch duty cycles that can be set in a solid state circuit breaker according to an embodiment of the present disclosure.
Figure 4:
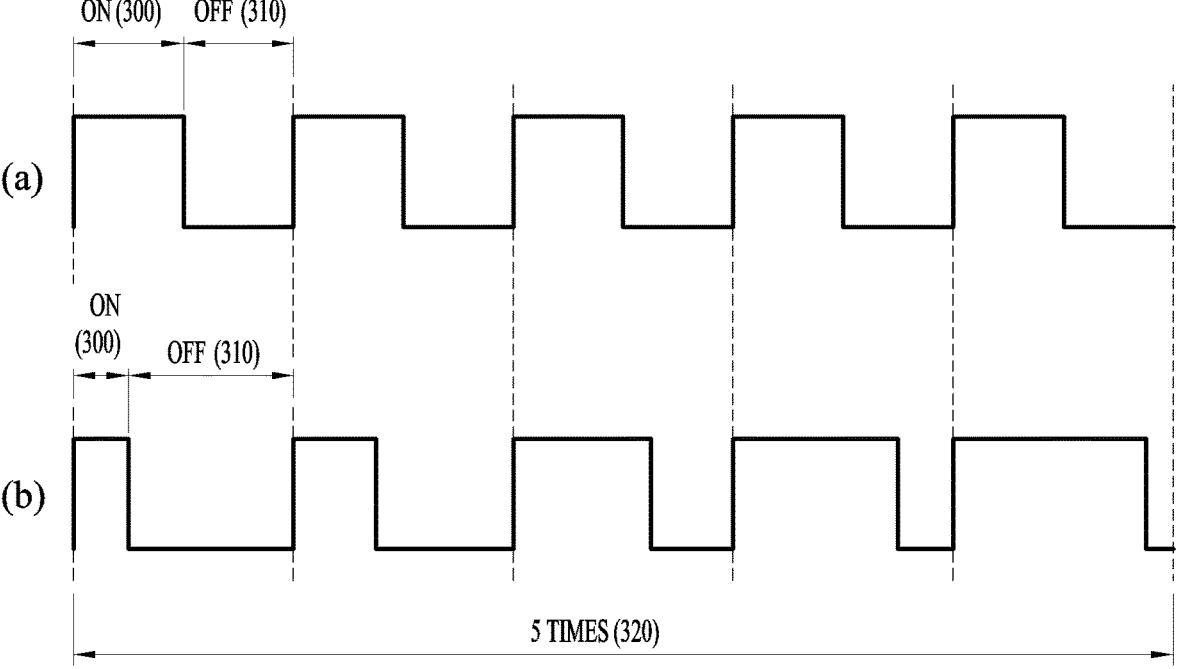

FIGS. 3 and 4 show examples of a number of on/off repetitions of the semiconductor switch and a duty cycle of the semiconductor switch that can be set in the solid state circuit breaker according to an embodiment of the present disclosure as described above.

First, referring to FIG. 3, (a) to (c) of FIG. 3 show an example in which the number of on/off repetitions (320) of the semiconductor switch is set to 5 in a preset time period as a cycle. In this case, a ratio of a time period in which the semiconductor switch is turned on during one cycle, that is, a duty cycle of the semiconductor switch may be set differently.

For an example, (a) of FIG. 3 shows an example in which the duty cycle of the semiconductor switch is set to 50%. When the duty cycle is 50% as described above, the semiconductor switch remains turned on for 50% of one cycle and turned off for the remaining 50%, and thus a ratio of the turn-on time and the turn-off time may be equal to 1:1 as shown in (a) of FIG. 3.

On the other hand, the semiconductor switch duty cycle may be set such that a time period in which the semiconductor switch is turned on is shorter than a time period in which the semiconductor switch is turned off. For example, when the semiconductor switch duty cycle is 25%, as shown in (b) of FIG. 3, the semiconductor switch may remain turned on for 25% of one cycle, and may remain turned off for the remaining 75% of the time period. When the turn-on time, that is, the duty cycle of the semiconductor switch, is low as described above, the amount of current supplied from the system during one cycle may be less.

Meanwhile, unlike (b) in FIG. 3, the semiconductor switch duty cycle may be set such that a time period in which the semiconductor switch is turned on is longer than a time period in which the semiconductor switch is turned off. For example, when the semiconductor switch duty cycle is 75%, as shown in (c) of FIG. 3, the semiconductor switch remains turned on for 75% of one cycle, and remains turned off for the remaining 25% of the time period. When the turn-on time, that is, the duty cycle of the semiconductor switch, is high as described above, the amount of current supplied from the system during one cycle may be greater.

As shown in (a) to (c) of FIG. 3, the semiconductor switch duty cycle according to an embodiment of the present disclosure may be set in various ways. In this case, the user may arbitrarily set the semiconductor switch duty cycle to control the amount of current that can be supplied to the load during one cycle.

Meanwhile, not only the duty cycle of the semiconductor switch, but also the turn-on and turn-off periods of the semiconductor switch may be set in various ways. For an example, the user may set the number of times the semiconductor switch is turned on and/or turned off to 5 times during a preset time period as shown in (a) to (c) of FIG. 3, as well as may increase the number of times and set it to 7 times as shown in (d) of FIG. 3. In this case, since the number of on/off repetitions increases during the same time, an on/off time period in which the semiconductor switch is turned on and off once may be shorter.

In this case, when the number of on/off repetitions of the semiconductor switch during a preset time period becomes too large, it may be ineffective. Accordingly, when the preset time period is determined, the control unit 100 may present the minimum and maximum values of the number of on/off repetitions of the semiconductor switch to the user as a guideline. In this case, the guideline may be displayed through an input unit when the input unit of the solid state circuit breaker is integrated with a display unit, such as a touch screen, or may be transmitted to the remote controller 190 through the communication unit 171, and displayed through the display unit of the remote controller 190. Alternatively, when the solid state circuit breaker further includes a display unit (not shown), the guideline may be displayed through the display unit. Alternatively, when the solid state circuit breaker further includes an audio output unit (not shown), the guideline may be provided in the form of audio information.

Meanwhile, a preset time period during which the semiconductor switch is repeatedly turned on and off may also of course be arbitrarily determined by the user. In this case, to avoid setting a time period that is too long or too short, the control unit 100 may present the minimum and maximum values for the preset time period as a guideline.

Meanwhile, in the above-mentioned FIG. 3, an on-time period and an off-time period of the semiconductor switch for each cycle are the same, but of course, the on-time period of the semiconductor switch, that is, a duty cycle, may be set differently for each cycle.

For an example, a duty cycle of the semiconductor switch may be set to maintain the same duty cycle during the same semiconductor switch on/off cycle, as shown in (a) of FIG. 4, and also the semiconductor switch duty cycle, that is, a time period in which the semiconductor switch is turned on, may be set to gradually increase.

Meanwhile, as shown in (b) of FIG. 4, when the semiconductor switch duty cycle is set to gradually increase, the longer the semiconductor switch continues to be turned on and off, the longer the semiconductor switch turns on. That is, as the duty cycle is small at the beginning, the system and the load may be connected for only a short period of time, but as time passes, the duty cycle gradually increases, allowing the system and the load to be connected for increasingly longer periods of time.

In this case, due to the nature of the inrush current, a lot of current flows in faster at the beginning of connection, and therefore, when a repeated on/off cycle of the semiconductor switch is set as shown in (b) of FIG. 4, there is an effect of limiting the amount of current flowing in at the beginning. Furthermore, as the semiconductor switch is repeatedly turned on and off, the amount of inrush current decreases when the capacitor of the load is charged, and therefore, as time passes, the circuit and the load may be connected for a longer period of time to ensure that more current is supplied to the load. Furthermore, when the duty cycle gradually increases to reach 100%, the semiconductor switch may remain turned on.

On the other hand, when the duty cycle is increased as an on/off cycle of the semiconductor switch increases as shown in (b) of FIG. 4, an amount of current supplied to the load may be limited at the beginning when an amount of inrush current is large as described above, and as time passes, the amount of current supplied to the load may be increased. Therefore, it is easier to cut off the supply of a current to the load prior to reaching a current level at which a hardware trip is generated, and also when the amount of the inrush current is reduced, more current may be supplied to the load in the same period of time, and thus the inrush current may be mitigated within a shorter period of time.

Meanwhile, FIGS. 3 and 4 are only examples to assist in describing the present disclosure, and of course, the present disclosure is not limited thereto. Therefore, the duty cycle and the number of on/off repetitions of the semiconductor switch may of course be set in many different ways, unlike what is shown in FIGS. 3 and 4.

In the above description, the configuration of the solid state circuit breaker according to an embodiment of the present disclosure and the duty cycle and the number of on/off repetitions of the semiconductor switch that can be set to mitigate an inrush current have been described.

In the following description, embodiments related to the foregoing control method of the solid state circuit breaker will be described in detail with reference to a plurality of flowcharts. However, it will be apparent to those skilled in the art that the present disclosure is not limited to the following description, and can be embodied in many different forms without departing from the essential features.

Meanwhile, at least one of the system A and the system B may be a direct current (DC) power system that uses direct current (DC) power. Additionally, the other one may be a DC load that is driven by receiving a DC current supplied from the DC power system. Alternatively, both the system A and the system B may be direct current power systems. In the case of a direct current as described above, since a current with a constant voltage is continuously supplied, the solid state circuit breaker according to an embodiment of the present disclosure may turn on and off the semiconductor switch based on the number of on/off repetitions and the duty cycle of semiconductor switch that are received from the user.

Figure 5A:
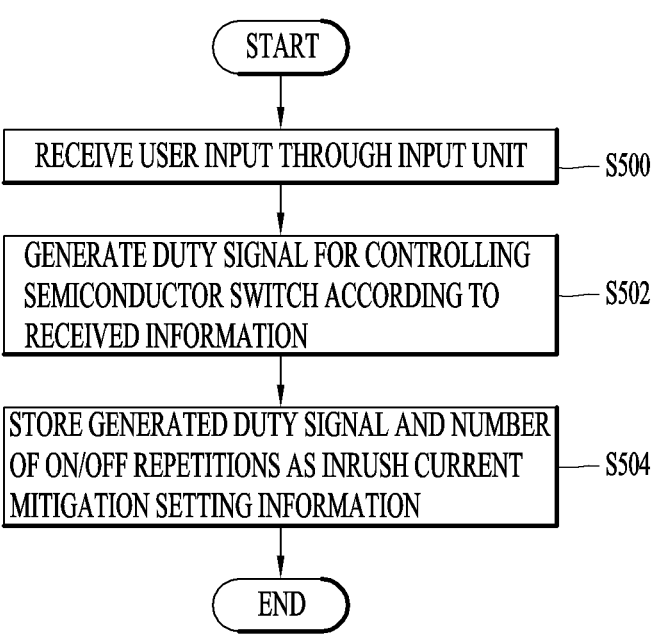
FIGS. 5A and 5B are flowcharts showing a process of generating, by a solid state circuit breaker according to an embodiment of the present disclosure, inrush current mitigation setting information based on information received from a user, and an operation process of mitigating an inrush current flowing in during an initial start-up of a load according to the set inrush current mitigation setting information.
Figure 5B:
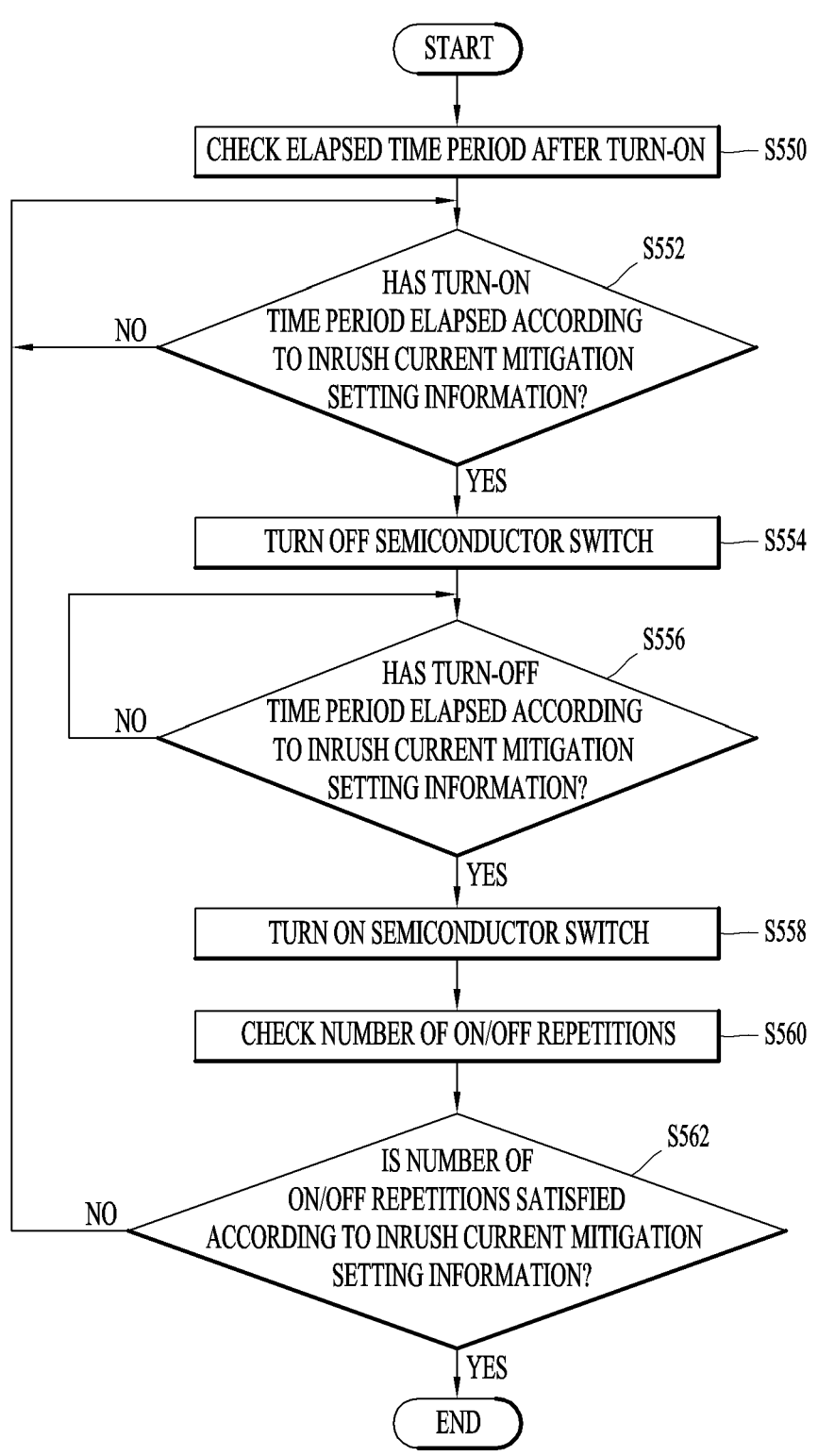

FIGS. 5A and 5B are flowcharts showing a process of generating, by a solid state circuit breaker according to an embodiment of the present disclosure as described above, inrush current mitigation setting information based on information received from a user, and an operation process of mitigating an inrush current flowing in during an initial start-up of a load according to the set inrush current mitigation setting information.

First, referring to FIG. 5A, the control unit 100 of the solid state circuit breaker according to an embodiment of the present disclosure may receive a user's input through the input unit 170 prior to turning on the semiconductor switch to connect between the system and the load (S500). In this case, the user's input may be received directly through the input unit 170 or received through the remote controller 190.

Here, the user's input received through the input unit 170 may include setting information of the semiconductor switch to mitigate an inrush current that occurs when the load is connected to the system, such as information on a number of on/off times of the semiconductor switch, and a ratio of a time period in which the semiconductor switch is on and a time period in which the semiconductor switch is off during one cycle in which the semiconductor switch is turned on and off, that is, a semiconductor switch duty cycle.

Furthermore, when the user input is received, the control unit 100 may generate a duty signal for controlling the semiconductor switch according to the received information (S502). Here, the duty signal may be a signal having a plurality of cycles according to a number of on/off times included in the inrush current mitigation setting information, and each cycle refers to a time period in which the semiconductor switch is turned on and off according to the semiconductor switch duty cycle.

Meanwhile, as described above, the turn-on and turn-off of the semiconductor switch may be controlled based on a gate voltage applied to the gate terminal of the semiconductor switch. Therefore, the duty signal may be a voltage signal applied to the gate terminal of each semiconductor switch, and in this case, the voltage at the time when the duty signal is turned on (e.g., ON (300) in FIGS. 3 and 4) may be a voltage above a threshold voltage of each semiconductor switch. On the other hand, a voltage when the duty signal is turned off (e.g., OFF (310) in FIGS. 3 and 4) may be a voltage below the threshold voltage of each semiconductor switch.

For an example, when the set number of on/off times of the semiconductor switch is 5, a duty signal similar to (a) to (c) of FIG. 3 or FIG. 4 may be formed according to the semiconductor switch duty cycle. Alternatively, when the set number of on/off times of the semiconductor switch is 7, a duty signal similar to (d) of FIG. 3 may be generated.

Furthermore, the control unit 100 may store the generated duty signal as setting information for mitigating the inrush current (S504). Then, the inrush current mitigation setting information may be stored in the memory 180, and may be set to be automatically executed when the system and load are initially connected to each other.

That is, the control unit 100 of the solid state circuit breaker may automatically start the control of the semiconductor switch according to the inrush current mitigation setting information when the solid state circuit breaker is turned on in a turned-off state. Hereinafter, when the load is connected to the system in a state where the load is not connected to the system (no-load state) as described above, an operation of the solid state circuit breaker according to the inrush current mitigation setting information will be referred to as an initial operation of the solid state circuit breaker.

During the initial operation, the control unit 100 of the solid state circuit breaker may not execute the soft trip function even when a condition for performing a soft trip is satisfied as described above. Therefore, an initial operation time period of the solid state circuit breaker may be a time period during which the soft trip function of the semiconductor switch is limited.

Meanwhile, FIG. 5B shows an operation process of the control unit 100 when the solid state circuit breaker is initially operated according to inrush current mitigation setting information set in FIG. 5A. For the sake of convenience of explanation, the following description assumes a case where the solid state circuit breaker is turned on in a turned-off state.

Referring to FIG. 5B, when the solid state circuit breaker is turned on, the control unit 100 may control a gate driver to apply a gate voltage above the threshold voltage to the semiconductor switch. Therefore, the semiconductor switch may be turned on, and the system and the load may be connected to supply a current from the system to the load.

When the system and the load are connected due to the turn-on of the solid state circuit breaker as described above, the control unit 100 may start the initial operation, and check an elapsed time period after the semiconductor switch has been turned on according to the initial operation (S550).

Furthermore, the control unit 100 may detect whether the time period checked in the step S550 has elapsed the turn-on time period of the semiconductor switch duty cycle according to preset inrush current mitigation setting information (S552). Furthermore, when the turn-on time period set in the duty cycle has elapsed, the gate driver may be controlled to apply a gate voltage below the threshold voltage to the semiconductor switch (S554). Therefore, the semiconductor switch may be turned off, and a connection between the load and the system may be interrupted. Therefore, the supply of a current from the system may be cut off.

Then, the control unit 100 may detect whether the turn-off time period of the semiconductor switch has elapsed the turn-off time period of the semiconductor switch duty cycle according to the inrush current mitigation setting information (S556). Furthermore, when the turn-off time period set in the duty cycle has elapsed, the gate driver may be controlled to apply a gate voltage above the threshold voltage to the semiconductor switch (S558). Therefore, the semiconductor switch may be turned on again, and the load and the system may be connected again. Therefore, the supply of the current from the system may be resumed.

Meanwhile, as the semiconductor switch is turned on again after being turned off, when the semiconductor switch is turned on and off once according to a signal period of the duty signal, the control unit 100 may check a number of times in which the semiconductor switch is turned on and off (S560).

Furthermore, the control unit 100 may detect whether the number of times in which the semiconductor switch is turned on and off checked in the step S560 reaches the number of on/off repetitions of the semiconductor switch set by the user's input (S562).

As a result of the detection in the step S562, when the number of times checked in the step S560 does not reach the number of on/off repetitions of the semiconductor switch, the control unit 100 may proceed to the step S552 to detect whether the turn-on time period of the semiconductor switch has elapsed a turn-on time period according to the semiconductor switch duty cycle. Furthermore, a process subsequent thereto may be performed again depending on the detection result.

On the other hand, as a result of the detection in the step S562, when the number of times checked in the step S560 reaches the preset number of on/off repetitions of the semiconductor switch, the control unit 100 may end an initial operation of the solid state circuit breaker. Therefore, the initial operation may be ended while the semiconductor switch is turned on, and accordingly, the semiconductor switch may remain in a turned-on state after the initial operation is ended.

Meanwhile, in the foregoing description, it has been described on the assumption that the solid state circuit breaker is turned on in a turned-off state, but, the present disclosure may of course be applicable to other cases where the supply of a current is resumed while a connection between the system and the load is interrupted and the supply of the current to the load is completely cut off. For an example, the present disclosure may also be applicable to a case where the solid state circuit breaker physically interrupts a connection between the system and the load due to a hardware trip, and then an accident in the system or load is recovered and the connection between the system and the load is physically restored (e.g., the cut-off switch 150 is off).

Meanwhile, according to the foregoing description, in the solid state circuit breaker according to an embodiment of the present disclosure, it has been mentioned that at least one of the duty cycle and the number of on/off repetitions of the semiconductor switch can be determined based on the state of the solid state circuit breaker in addition to the user's input.

In this case, the state of the solid state circuit breaker for determining the duty cycle and the number of on/off repetitions of the semiconductor switch may be a state in which a condition for generating the soft trip is satisfied. That is, the control unit 100 of the solid state circuit breaker according to an embodiment of the present disclosure may automatically determine the duty cycle and the number of on/off repetitions of the semiconductor switch based on whether the condition for generating the soft trip is satisfied.

Figure 6:
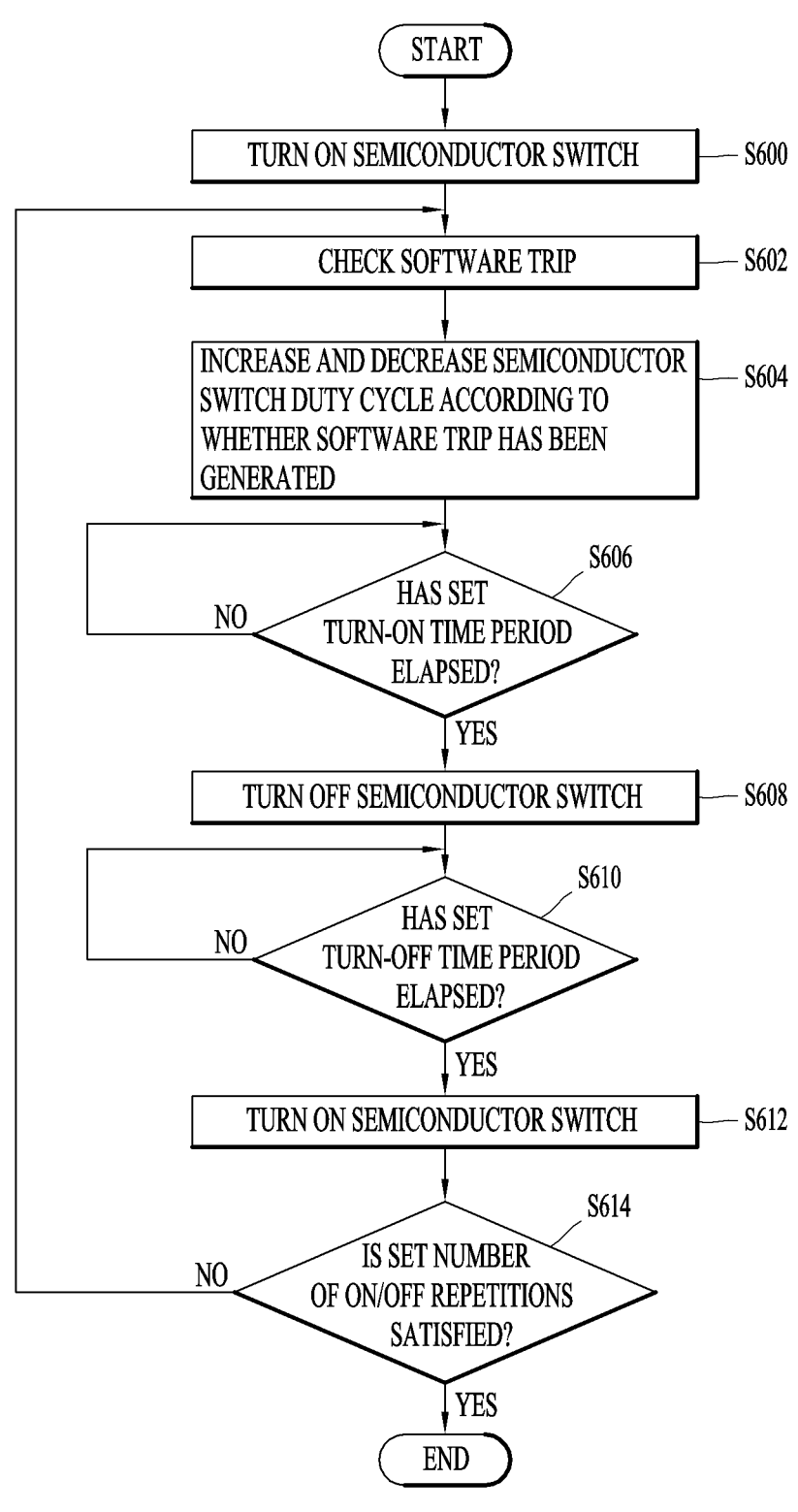
FIG. 6 is a flowchart showing an operation process of dynamically changing, by a solid state circuit breaker according to an embodiment of the present disclosure, a duty cycle of a semiconductor switch based on an operating state of the solid state circuit breaker.

First, FIG. 6 is a flowchart showing an operation process of dynamically changing, by a solid state circuit breaker according to an embodiment of the present disclosure, a duty cycle of a semiconductor switch based on a state of the solid state circuit breaker.

Referring to FIG. 6, when the solid state circuit breaker is turned on, the control unit 100 may control the gate driver to apply a gate voltage above the threshold voltage to the semiconductor switch (S600). Therefore, the semiconductor switch may be turned on, and the system and the load may be connected to supply a current from the system to the load.

Then, the control unit 100 may check whether the solid state circuit breaker satisfies the conditions for generating a soft trip (S602). Furthermore, the semiconductor switch duty cycle may be increased or decreased depending on whether the soft trip generation condition is satisfied (S604).

Here, as described above, the soft trip may be performed as a current in the solid state circuit breaker increases above a preset current level (second current level). Therefore, the step S602 may be checking whether the current inside the solid state circuit breaker has increased above the second current level.

Meanwhile, when the soft trip generation condition is not satisfied as a result of the detection in the step S602, the control unit 100 may increase a value of the semiconductor switch duty cycle in the step S604. In this case, when the duty cycle is increased, the turn-on time period of the semiconductor switch becomes longer in the same signal period, and thus the turn-off time period may become shorter. Therefore, more current may flow in from the system during one cycle of the duty signal.

On the other hand, when the soft trip generation condition is not satisfied as a result of the detection in the step S602, the control unit 100 may decrease a value of the semiconductor switch duty cycle in the step S604. In this case, when the duty cycle is decreased, the turn-on time period of the semiconductor switch becomes shorter in the same signal period, and thus the turn-off time period may become longer. Therefore, less current may flow in from the system during one cycle of the duty signal.

When the duty cycle is changed through the step S604, the control unit 100 may detect whether the turn-on time period according to the changed duty cycle has elapsed (S606). Furthermore, when the turn-on time period has elapsed, the gate driver may be controlled to apply a gate voltage below the threshold voltage to the semiconductor switch (S608). Therefore, the semiconductor switch may be turned off, and a connection between the system and the load may be interrupted to cut off a current from the system to the load.

Then, the control unit 100 may detect whether the turn-off time period of the semiconductor switch has elapsed the turn-off time period of the duty cycle changed in the step S604 (S610). Furthermore, when the turn-off time period of the duty cycle has elapsed, the gate driver may be controlled to apply a gate voltage above the threshold voltage to the semiconductor switch (S612). Therefore, the semiconductor switch may be turned on again, and the load and the system may be connected again. Therefore, the supply of the current from the system may be resumed.

Meanwhile, as the semiconductor switch is turned on again after being turned off, when the semiconductor switch is turned on and off once according to a signal period of the duty signal, the control unit 100 may detect whether the semiconductor switch is turned on and off as many times as a preset number of on/off times of the semiconductor switch (S614). In this case, the number of on/off times of the semiconductor switch may be set in advance by the user or the like.

As a result of the detection in the step S614, when the turn-on and turn-off of the semiconductor switch are not performed as many times as a preset number of on/off times of the semiconductor switch, the control unit 100 may proceed again to the step S602 while the semiconductor switch is turn on through the step S612 to check whether the soft trip generation condition is satisfied due to a current flowing into the solid state circuit breaker. Furthermore, the process may proceed to step S604 to increase or decrease the duty cycle of the semiconductor switch again depending on whether the soft trip generation condition is satisfied.

Furthermore, when the semiconductor switch duty cycle is changed in the step S604, the control unit 100 may perform the process from steps S606 to S612 again according to the changed duty cycle. Furthermore, the process may proceed again to step S614.

On the other hand, as a result of the detection in the step S614, when the turn-on and turn-off of the semiconductor switch are performed as many as a preset number of on/off times of the semiconductor switch, the control unit 100 may end the initial operation of the solid state circuit breaker to mitigate the inrush current. Therefore, the initial operation may be ended while the semiconductor switch is turned on (step S612), and accordingly, the semiconductor switch may remain in a turned-on state after the initial operation is ended.

Figure 7:
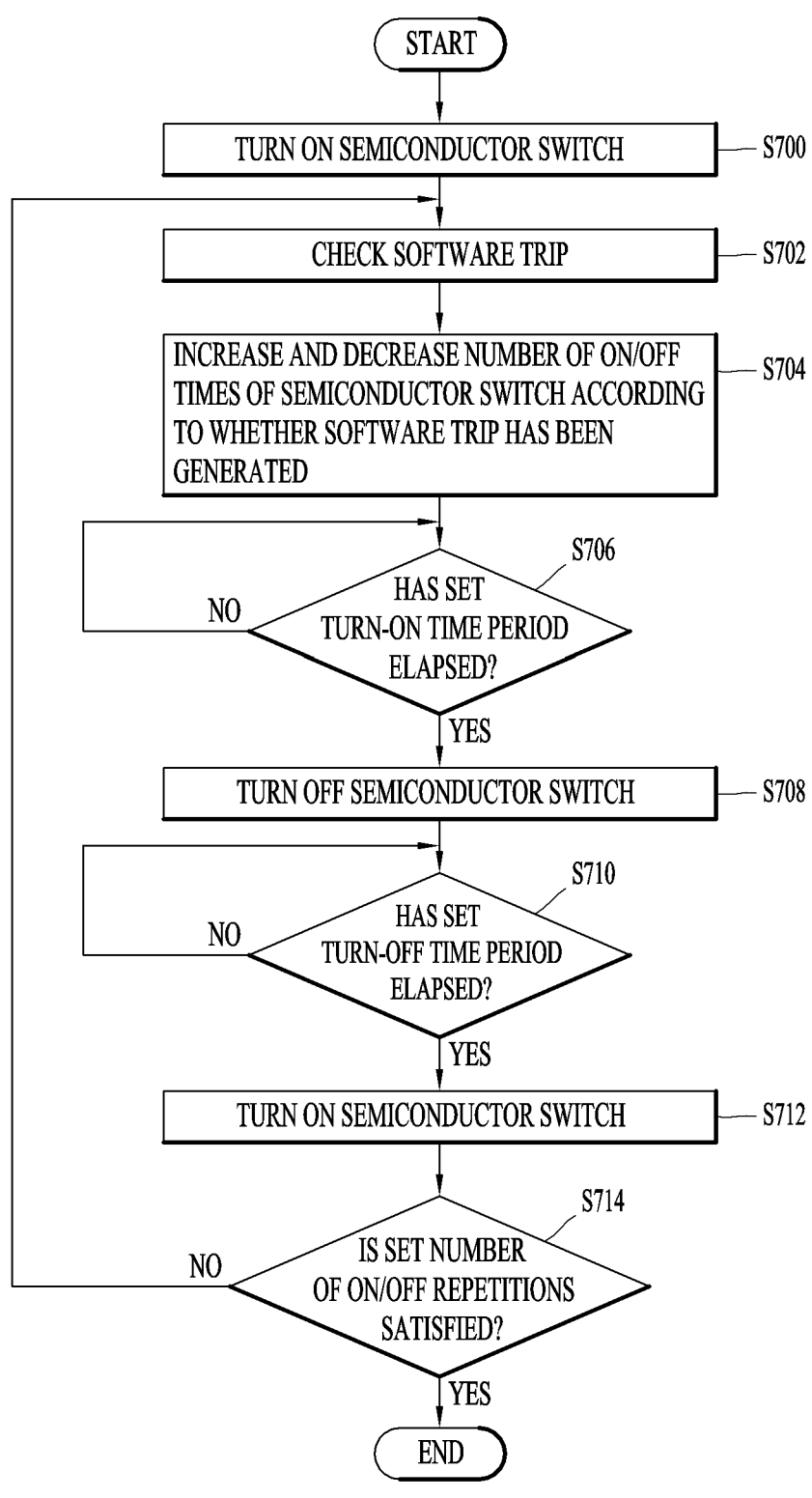
FIG. 7 is a flowchart showing an operation process of dynamically changing, by a solid state circuit breaker according to an embodiment of the present disclosure, a number of on/off repetitions of a semiconductor switch based on an operating state of the solid state circuit breaker.

Meanwhile, FIG. 7 is a flowchart showing an operation process of dynamically changing, by a solid state circuit breaker according to an embodiment of the present disclosure, a number of on/off times of a semiconductor switch based on a state of the solid state circuit breaker.

Referring to FIG. 7, when the solid state circuit breaker is turned on, the control unit 100 may control the gate driver to turn on the semiconductor switch (S700). Therefore, the system and the load are connected to supply a current from the system to the load. Furthermore, the control unit 100 may check whether a condition for generating a soft trip is satisfied (S702).

Additionally, the control unit 100 may increase or decrease the number of on/off repetitions of the semiconductor switch depending on whether the soft trip generation condition is satisfied (S704). In this case, when the soft trip generation condition is not satisfied, the control unit 100 may decrease the number of on/off times of the semiconductor switch. For an example, the control unit 100 may decrease a currently set number of on/off times of the semiconductor switch by a preset value (e.g., once) or decrease it according to a preset ratio (e.g., one-half times). When the number of on/off times of the semiconductor switch is decreased in this manner, the initial operation time period of the solid state circuit breaker for mitigating the inrush current may become shorter.

On the other hand, when the soft trip generation condition is satisfied in the step S702, the control unit 100 may increase the number of on/off times of the semiconductor switch in the step S704. For an example, the control unit 100 may increase a currently set number of on/off times of the semiconductor switch by a preset value (e.g., once) or increase it according to a preset ratio (e.g., twice). In this case, when the number of on/off times of the semiconductor switch is increased in this way, the initial operation time period of the solid state circuit breaker to mitigate the inrush current may be extended.

When the number of on/off times of the semiconductor switch is changed through the step S704, the control unit 100 may detect whether the turn-on time period according to a preset semiconductor switch duty cycle has elapsed (S706). Furthermore, when the turn-on time period has elapsed, the gate driver may be controlled to turn off the semiconductor switch (S708). In this case, the semiconductor switch duty cycle may be set in advance by the user or the like.

Furthermore, the control unit 100 may detect whether the turn-off time period of the semiconductor switch has elapsed the turn-off time period of the preset semiconductor switch duty cycle (S710). Furthermore, when the turn-off time has elapsed, the gate driver may be controlled to turn on the semiconductor switch again (S712).

Meanwhile, as the semiconductor switch is turned on again, when the semiconductor switch is turned on and off once according to a signal period of the duty signal, the control unit 100 may detect whether the semiconductor switch is turned on and off as many times as a number of on/off times of the semiconductor switch changed in the step S704 (S714).

As a result of the detection in the step S714, when the turn-on and turn-off of the semiconductor switch are not performed as many times as a number of on/off times of the semiconductor switch set in the step S704, the control unit 100 may proceed again to the step S702 while the semiconductor switch is turn on through the step S712 to check whether the soft trip generation condition is satisfied due to a current flowing into the solid state circuit breaker. Furthermore, the process may proceed to step S704 to set a number of on/off times of the semiconductor switch again depending on whether the soft trip generation condition is satisfied. Therefore, the number of on/off times of the semiconductor switch may be changed again.

Furthermore, the control unit 100 may perform the process again from step S706 to step S712. Furthermore, the process may proceed again to step S714.

On the other hand, as a result of the detection in the step S714, when the turn-on and turn-off of the semiconductor switch are performed as many as the number of on/off times of the semiconductor switch set in the step S704, the control unit 100 may end the initial operation of the solid state circuit breaker to mitigate the inrush current. Therefore, the initial operation may be ended while the semiconductor switch is turned on (step S712), and accordingly, the semiconductor switch may remain in a turned-on state after the initial operation is ended.

Meanwhile, according to the foregoing description, checking whether the soft trip generation condition is satisfied in step S602 of FIG. 6 or step 702 of FIG. 7 has been described. In this case, the control unit 100 of the solid state circuit breaker according to an embodiment of the present disclosure may determine whether physical interruption using a cut-off switch is necessary in a process of detecting whether the soft trip generation condition is satisfied, and control the cut-off switch 150 according to a result of the determination to physically separate between the system and the load. Accordingly, the solid state circuit breaker according to an embodiment of the present disclosure may protect other systems or loads, or internal elements of the solid state circuit breaker, from an overcurrent due to the occurrence of an accident in the system or load, even while performing an initial operation to mitigate the inrush current.

Figure 8:
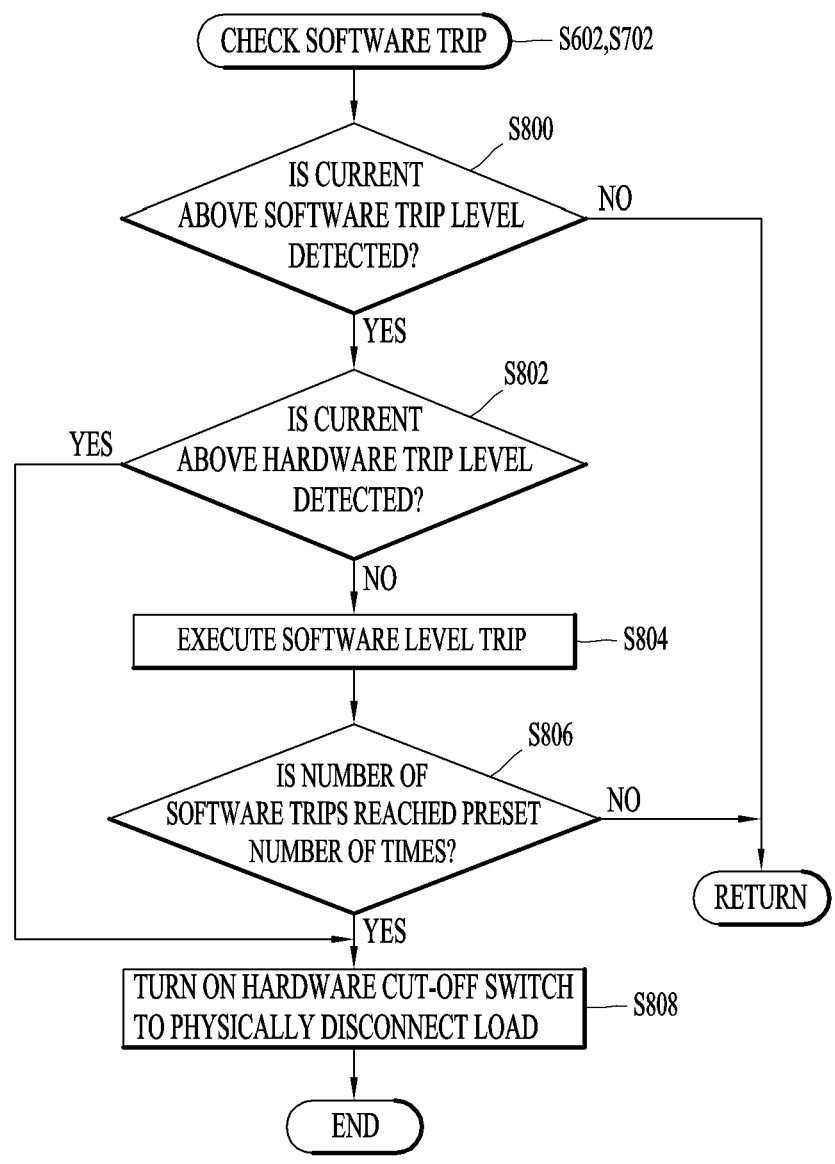
FIG. 8 is a flowchart showing an operation process of physically disconnecting, by a solid state circuit breaker according to an embodiment of the present disclosure, a load from a system when a preset condition is met.

FIG. 8 is a flowchart showing an operation process of physically disconnecting, by a solid state circuit breaker according to an embodiment of the present disclosure as described above, a load from a system in a process of checking whether a soft trip generation condition is satisfied. Referring to FIG. 8, when proceeding to step S602 of FIG. 6 or step S702 of FIG. 7, the control unit 100 of the solid state circuit breaker may detect a current level supplied from the system to the load as the semiconductor switch is turned on. Additionally, the control unit 100 may detect whether the detected current level is above a current level (second current level: soft trip level) at which a soft trip is generated (S800).

When the current level detected in the step S800 is below the soft trip level, the control unit 100 may not execute a hard trip. Therefore, the process may proceed to step S604 of FIG. 6 or step S704 of FIG. 7. In this case, since the soft trip generation condition is not satisfied, the control unit 100 may increase the semiconductor switch duty cycle when proceeding to the step S604 of FIG. 6. Additionally, when proceeding to step S704 of FIG. 7, the control unit 100 may decrease a number of on/off times of the semiconductor switch.

On the other hand, when the current level detected in the step S800 is above the soft trip level, the semiconductor switch may detect whether a currently detected current is above a hardware trip level (first current level) that generates a hardware trip (S802). Here, as described above, the first current level may be a current level that has a greater value than the second current level.

Here, it is assumed that a current level (first current level) at which the hardware trip is generated and a current level at which the cut-off switch is operated are the same. In this case, upon detecting a current exceeding the current level at which a hardware trip is generated, both an interruption by the cut-off switch 150 and the hardware trip may be carried out.

As a result of the detection in the step S802, when the current level currently detected in the solid state circuit breaker has a value above the first current level, the control unit 100 may determine that a current having a magnitude that may cause damage to the system or load flows due to an accident or the like. Accordingly, the control unit 100 may turn on the cut-off switch 150 to physically disconnect the load from the system (S808). In this case, as a current exceeding the current level at which a hardware trip is generated is detected, a hardware trip may be carried out on the semiconductor switch itself.

On the other hand, as a result of the detection in the step S802, when the current level currently detected in the solid state circuit breaker has a value below the first current level, the control unit 100 may increase a count value of the number of times in which the soft trip generation condition is satisfied. (S804).

When the number of times in which the soft trip condition is satisfied increases in the step S804, the control unit 100 may check whether the number of times in which the soft trip condition has been satisfied up to the present has reached a preset number of times (S806). Furthermore, when the number of times in which the soft trip condition is satisfied reaches the preset number of times, the control unit 100 may determine that an overcurrent continuously flows in.

In this case, when an overcurrent continuously flows in, it may cause damage to other systems or loads, and thus the control unit 100 may proceed to the step S808 to turn on the cut-off switch 150. Therefore, even when a current sufficient to cause a hardware trip does not flow in, elements inside the solid state circuit breaker may be protected from an overcurrent through physical separation when a preset condition is satisfied.

On the other hand, as a result of the check in the step S806, when the number of times in which the soft trip condition is satisfied does not reach the preset number of times, the control unit 100 may proceed to step S604 of FIG. 6 or step S704 of FIG. 7. In this case, since the soft trip condition is satisfied according to a result of the detection in the step S800 of FIG. 8, when proceeding to the step S604 of FIG. 6, the control unit 100 may reduce the semiconductor switch duty cycle. Additionally, when proceeding to step S704 of FIG. 7, the control unit 100 may increase a number of on/off times of the semiconductor switch. In the foregoing description, it has been described on the assumption that the first current level and the current level at which the cut-off switch is operated are the same. However, the present disclosure is not of course limited thereto. That is, the first current level at which the hardware trip level is generated and the current level at which the cut-off switch is operated may be different from each other.

Meanwhile, according to the foregoing description, it has been mentioned that the solid state circuit breaker according to an embodiment of the present disclosure can set a duty cycle and a number of on/off repetitions of the semiconductor switch based on the characteristics of a current flowing therein.

Figure 9:
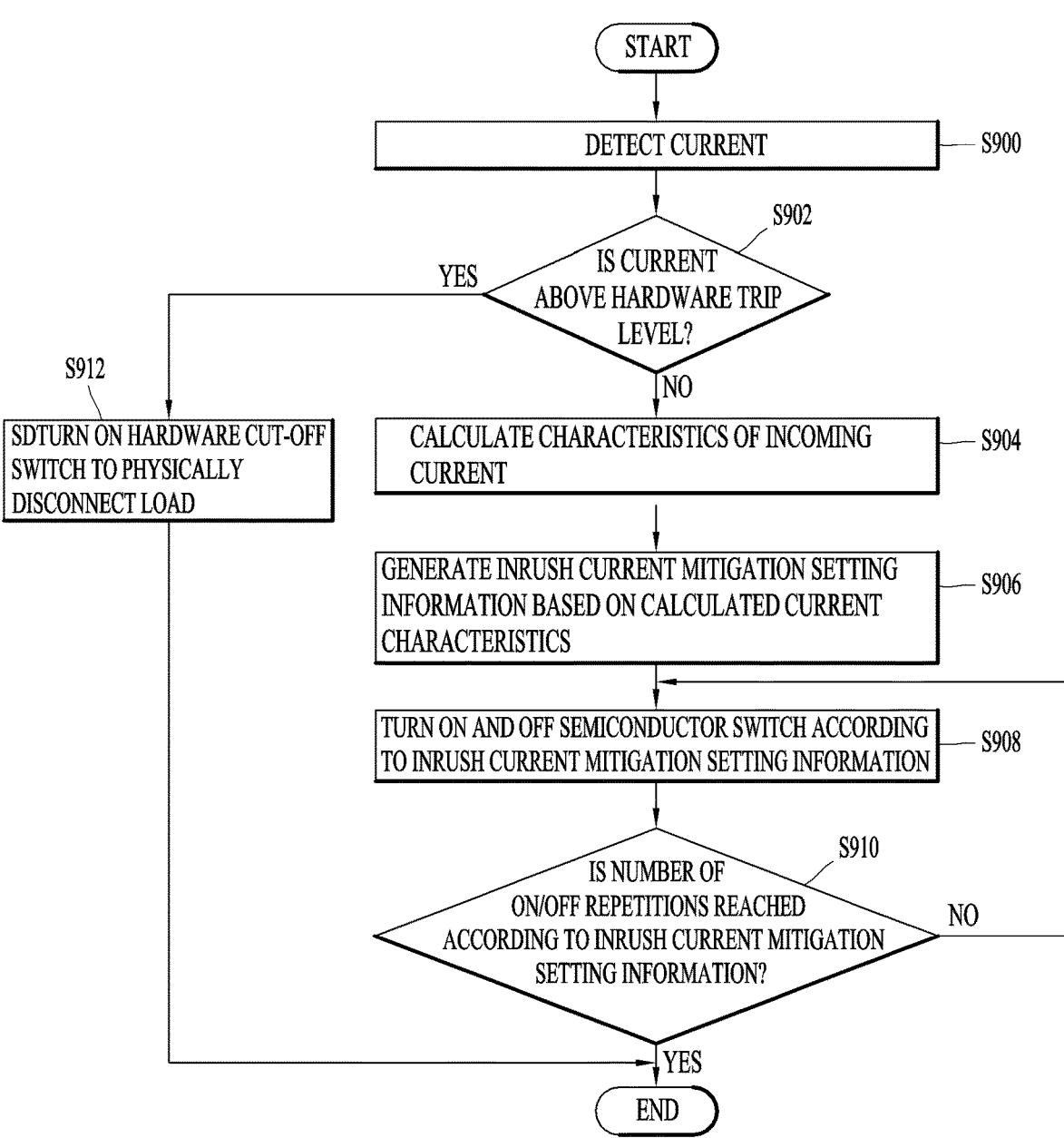
FIG. 9 is a flowchart showing a process of generating, by a solid state circuit breaker according to an embodiment of the present disclosure, inrush current mitigation setting information based on an increase rate of an incoming current, and controlling a semiconductor switch according to the generated setting information.

FIG. 9 is a flowchart showing a process of generating, by a solid state circuit breaker according to an embodiment of the present disclosure as described above, inrush current mitigation setting information based on the characteristics of an incoming current and performing an initial operation to mitigate the inrush current according to the generated setting information.

Referring to FIG. 9, when the solid state circuit breaker is turned on, the control unit 100 of the solid state circuit breaker may start an initial operation to mitigate an inrush current. In this case, the control unit 100 may measure a magnitude of a current flowing between the power system and the load at preset time intervals from the current sensor 160 (S900). Furthermore, the control unit 100 may determine whether the measured magnitude of the current is above a current level that generates a hardware trip (S902).

As a result of the determination in the step S902, when the measured magnitude of the current is above the current level that generates a hardware trip, the control unit 100 may turn on the cut-off switch 150, which is a hardware switch, to protect internal elements of the solid state circuit breaker through physical separation (S912). In this case, as a current exceeding the current level at which a hardware trip is generated is detected, a hardware trip may be carried out on the semiconductor switch itself.

However, as a result of the determination in the step S902, when the measured magnitude of the current is below the current level that generates a hardware trip, the control unit 100 may calculate the current characteristics from the magnitudes of the current measured for a predetermined time period (S904).

Here, the current characteristics may include an amount of increase or decrease over time in the magnitude of the current, that is, an amount of change in the magnitude of the current over time (e.g., a slope of an amount of change in the magnitude of the current over time). The current characteristics may also include statistical information such as a minimum or maximum magnitude of the current and an average magnitude of the current.

Meanwhile, when the current characteristics are extracted in the step S904, the control unit 100 may generate setting information for inrush current mitigation, that is, inrush current mitigation setting information, based on the extracted current characteristics (S906).

In the step S906, the control unit 100 may set at least one of a duty cycle and a number of on/off repetitions of the semiconductor switch based on an amount of increase in the magnitude of the current over time.

For an example, the control unit 100 may set the duty cycle to decrease as an amount of increase in the magnitude of the current over time increases. That is, as an amount of increase in the magnitude of the current over time increases, the inrush current increases faster, and thus the control unit 100 may set the duty cycle to be smaller, thereby preventing a current exceeding a hardware trip level from flowing in during a time period in which the semiconductor switch is turned on. In this case, as the duty cycle becomes smaller, a time period in which the semiconductor switch is turned off within one cycle of the duty signal becomes longer, and thus a current level in the solid state circuit breaker may sufficiently drop.

Alternatively, the control unit 100 may increase the number of on/off repetitions of the semiconductor switch as an amount of increase in the magnitude of the current over time increases. That is, the greater an increase in the magnitude of the current over time, the larger the inrush current, and therefore, the control unit 100 may increase the number of on/off repetitions of the semiconductor switch to sufficiently eliminate the inrush current.

As described above, information for generating inrush current mitigation setting information differently depending on the current characteristics may be stored in the memory 180. For an example, the memory 180 may include a plurality of inrush current mitigation setting information in which at least one of a duty cycle and a number of on/off repetitions of the semiconductor switch is different, and may detect and set any one of the plurality of inrush current mitigation setting information based on the current characteristics calculated in the step S904.

Alternatively, the memory 180 may include inrush current mitigation setting information including a duty cycle and a number of on/off repetitions of the semiconductor switch. In this case, the control unit 100 may change at least one of the duty cycle and the number of on/off repetitions of the semiconductor switch in the inrush current mitigation setting information stored in the memory 180 according to the current characteristics calculated in the step S904. Alternatively, the control unit 100 may change a time period required for the initial operation (i.e., an overall time period required to repeatedly turn the semiconductor switch on and off), a time period in which the semiconductor switch is turned on and off once, and a length of time period corresponding to one cycle according to the calculated current characteristics.

Meanwhile, when setting information for mitigating the inrush current is generated in step S906, the control unit 100 may turn on and turn off the semiconductor switch according to the setting information (S908). Additionally, the control unit 100 may check whether the turn-on and turn-off of the semiconductor switch have been repeated as many times as the number of on/off repetitions according to the set inrush current mitigation setting information (S910).

As a result of the check in the step S910, when the semiconductor switch is not turned on and off as many times as the number of on/off repetitions according to the inrush current mitigation setting information, the control unit 100 may proceed to step S908 to perform the turn-on and turn-off of the semiconductor switch again according to the set information (e.g., duty cycle). On the contrary, as a result of the check in the step S910, when the semiconductor switch is turned on and off as many times as the number of on/off repetitions according to the inrush current mitigation setting information, the control unit 100 may maintain the semiconductor switch in a turn-on state, and end an initial operation process of FIG. 9.

Meanwhile, in the foregoing description, an example in which the first and second semiconductor switches 111, 112 include N-channel MOSFET devices has been described, but the present disclosure is not, of course, limited thereto. For an example, any device, for example, IGBT, GTO, IGCT, or the like, that can be turned on/off by a gate drive voltage applied by the control unit 100, may be used instead of the MOSFET device, for the first and second semiconductor switches 111, 112.

Meanwhile, in the foregoing description, an example in which the solid state circuit breaker according to an embodiment of the present disclosure is used in a direct current power system and a direct current power load has been described, but the present disclosure is not, of course, limited thereto. For example, as shown above in FIGS. 6 to 8, the semiconductor switch duty cycle or the number of on/off repetitions of the semiconductor switch may be dynamically changed depending on an operating state of the solid state circuit breaker or a current state inside the solid state circuit breaker. Therefore, the present disclosure may of course be applicable not only to a direct current power system and a direct current power load, but also to an alternating current power system and an alternating current power load.

A control method of a control unit that controls a solid state circuit breaker in relation to the present disclosure may be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). Furthermore, the computer may include the control unit of the solid state circuit breaker.

Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A solid-state circuit breaker disposed between a power system and a load, the solid-state circuit breaker comprising:
   a semiconductor switch unit comprising a semiconductor switch that electrically connects or disconnects between the power system and the load depending on a voltage applied to a gate terminal thereof;
   a cut-off switch that physically connects or disconnects the solid-state circuit breaker and the load from the power system; and
   a control unit that controls, when the solid-state circuit breaker is turned on, the semiconductor switch to repeat turn-on and turn-off during a preset initial operation time period so as to gradually mitigate a magnitude of inrush current due to an initial connection between the power system and the load,
   wherein the control unit is further configured to:
      count, during an initial operation time period, a number of times in which a condition for executing a soft trip function is satisfied when a current level in the solid-state circuit breaker reaches a soft trip current level at which the soft trip function is executed; and
      operate the cut-off switch to physically separate between the power system and the load, when the number of times in which the condition for executing the soft trip function is satisfied is above a preset number of times, or when a current inside the solid-state circuit breaker is above a preset current level at which the cut-off switch operates.

2. The solid-state circuit breaker of claim 1, wherein the control unit executes, during the initial operation time period, only a hardware trip function only when a current level in the solid-state circuit breaker reaches a hard trip current level at which a trip function built into the semiconductor switch is executed.

3. The solid-state circuit breaker of claim 1, wherein the control unit controls the semiconductor switch such that the turn-on and turn-off are repeated in a preset time period as a cycle during the initial operation time period.

4. The solid-state circuit breaker of claim 3, further comprising:
   an input unit that receives a user's input,
   wherein the control unit receives initial operation information including information on a semiconductor switch duty cycle, which is a ratio between the preset time period and a time period in which the semiconductor switch is turned on, a number of on/off repetitions in which the semiconductor switch is repeatedly turned on and off during the initial operation time period, and the initial operation time period, through the input unit.

5. The solid-state circuit breaker of claim 4, wherein the control unit generates, when the initial operation information is received, a duty signal to control the semiconductor switch during the initial operation time period according to the initial operation information, and
   wherein the duty signal is a gate voltage signal to be applied to the gate terminal of the semiconductor switch according to the semiconductor switch duty cycle in the preset time period as a cycle.

6. The solid-state circuit breaker of claim 4, wherein in the semiconductor switch duty cycle, a turn-on time period of the semiconductor switch is set differently for each cycle, and as the turn-on and turn-off of the semiconductor switch continue, the turn-on time period of the semiconductor switch is formed to be longer within one cycle.

7. The solid-state circuit breaker of claim 1, further comprising:
   a plurality of gate drivers that apply a gate voltage to each gate terminal of the semiconductor switch,
   wherein the control unit controls at least one gate driver corresponding to semiconductor switch to apply a gate voltage above a threshold voltage or to apply a gate voltage below the threshold voltage to the gate terminal of the semiconductor switch to turn on and off the semiconductor switch.

8. The solid-state circuit breaker of claim 2,
   wherein the soft trip current level is a current level lower than the hard trip current level.

9. The solid-state circuit breaker of claim 2, further comprising:
   a memory comprising a semiconductor switch duty cycle, which is a ratio of the preset time period and a time period in which the semiconductor switch is turned on, and a number of on/off repetitions in which the semiconductor switch is repeatedly turned on and off during the initial operation time period,
   wherein the control unit increases or decreases at least one of the semiconductor switch duty cycle and the number of on/off repetitions depending on whether a condition for executing a soft trip function is satisfied while the semiconductor switch is repeatedly turned on and off.

10. The solid-state circuit breaker of claim 1, further comprising:
   a memory comprising a semiconductor switch duty cycle, which is a ratio of the preset time period and a time period in which the semiconductor switch is turned on, and a number of on/off repetitions in which the semiconductor switch is repeatedly turned on and off during the initial operation time period,
   wherein the control unit calculates inrush current characteristics of an inrush current according to an initial connection between the power system and the load, and increases or decreases at least one of the semiconductor switch duty cycle and the number of on/off repetitions according to the inrush current characteristics as calculated.

11. The solid-state circuit breaker of claim 10, wherein the inrush current characteristics comprise either a time-dependent amount of change in a magnitude of current detected by the solid-state circuit breaker during an initial connection between the power system and the load or a statistical calculation value in a current measurement value.

12. The solid-state circuit breaker according to claim 1, wherein the power system and the load are a direct current power system and a direct current power load.

13. A method of controlling a solid-state circuit breaker disposed between a power system and a load, the solid-state circuit breaker comprising a semiconductor switch, the method comprising:
   turning on, when the solid-state circuit breaker is turned on, the semiconductor switch to initially connect between the power system and the load;
   repeating turn-off and turn-on of the semiconductor switch so as to gradually mitigate a magnitude of inrush current due to an initial connection between the power system and the load during a preset initial operation time period, and wherein repeating of the turn-off and turn-on of the semiconductor switch further comprises:

checking whether a current level in the solid-state circuit breaker has satisfied an execution condition of a soft trip function;

checking a number of times in which the execution condition of the soft trip function is satisfied while the turn-off and turn-on of the semiconductor switch are repeated; and operating a cut-off switch to physically separate between the power system and the load when the execution condition of the soft trip function is satisfied a preset number of times or more.

14. The method of claim 13, wherein the preset initial operation time period is a time period in which only a hardware trip function is executed only when a current level in the solid-state circuit breaker reaches a hard trip current level at which a trip function built into the semiconductor switch is executed.

15. The method of claim 13, wherein repeating of the turn-off and turn-on of the semiconductor switch includes repeating of the turn-off and turn-on in a preset time period as a cycle during the initial operation time period, and limiting of an execution of a soft trip function when a current level in the solid-state circuit breaker reaches a soft trip current level at which the soft trip function is executed during the initial operation time period.

16. The method of claim 15, wherein the turn-off and turn-on of the semiconductor switch are performed by a gate voltage signal applied to a gate terminal of the semiconductor switch according to a semiconductor switch duty cycle, which is a ratio of a time period in which the semiconductor switch is turned on during one cycle in which the semiconductor switch is turned off and on once, and a number of on/off repetitions in which the semiconductor switch is repeatedly turned on and off, and wherein initially connecting between the system and the load further comprises generating the gate voltage signal based on the semiconductor switch duty cycle and the initial operation time period.

17. The method of claim 16, wherein repeating of the turn-off and turn-on of the semiconductor switch further comprises:

checking whether a current level in the solid-state circuit breaker has satisfied an execution condition of a soft trip function;

decreasing the semiconductor switch duty cycle when the execution condition of the soft trip function is satisfied; and increasing the semiconductor switch duty cycle when the execution condition of the soft trip function is not satisfied.

18. The method of claim 16, wherein repeating of the turn-off and turn-on of the semiconductor switch further comprises:

checking whether a current level in the solid-state circuit breaker has satisfied an execution condition of a soft trip function;

increasing the number of on/off repetitions of the semiconductor switch when the execution condition of the soft trip function is satisfied; and decreasing the number of on/off repetitions of the semiconductor switch when the execution condition of the soft trip function is not satisfied.

19. The method of claim 16, wherein initially connecting between the power system and the load further comprises:

calculating characteristics of an inrush current according to an initial connection between the power system and the load; and increasing or decreasing at least one of the semiconductor switch duty cycle and the number of on/off repetitions according to the calculated characteristics of the inrush current.

20. The method of claim 16, wherein in the semiconductor switch duty cycle, a turn-on time period of the semiconductor switch is set differently for each cycle, and as the turn-on and turn-off of the semiconductor switch continue, the turn-on time period of the semiconductor switch is formed to be longer within one cycle.

* * * * *